April 27, 1965  P. H. HAMISCH, SR  3,180,254
TAG MARKING MACHINE
Filed June 27, 1963  17 Sheets-Sheet 2
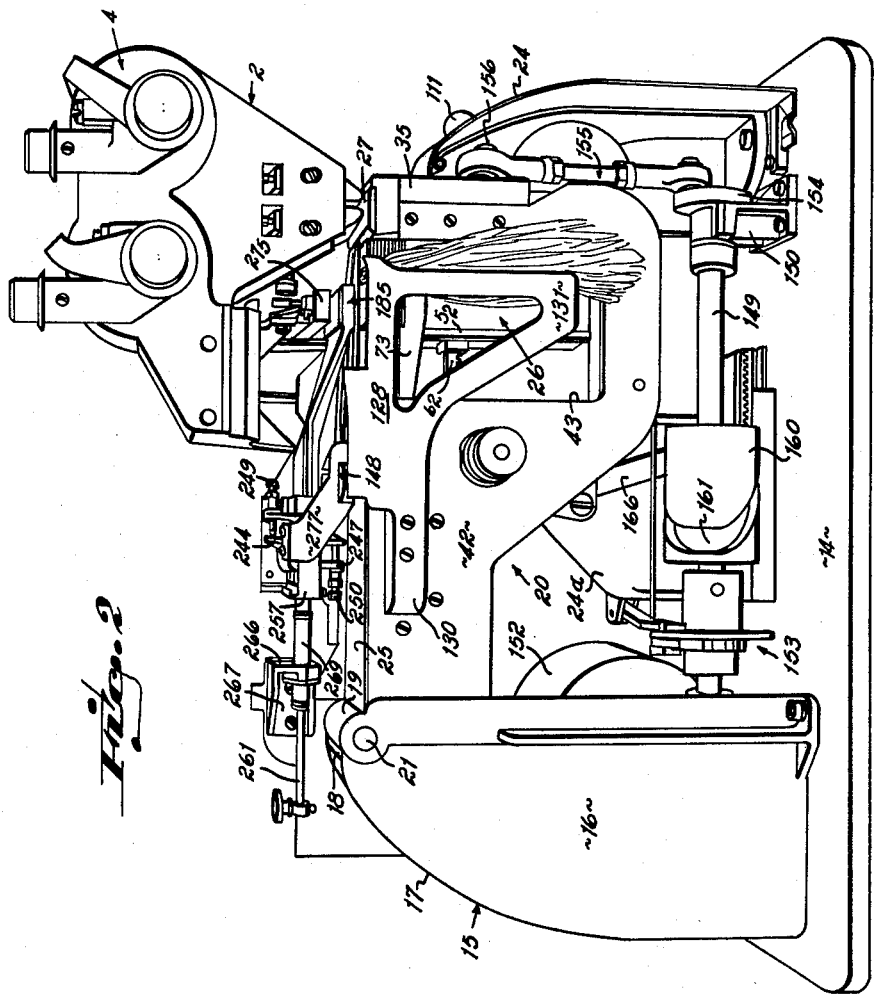
INVENTOR.
Paul H. Hamisch, Sr.
BY
Wood, Herron & Evans
ATTORNEYS

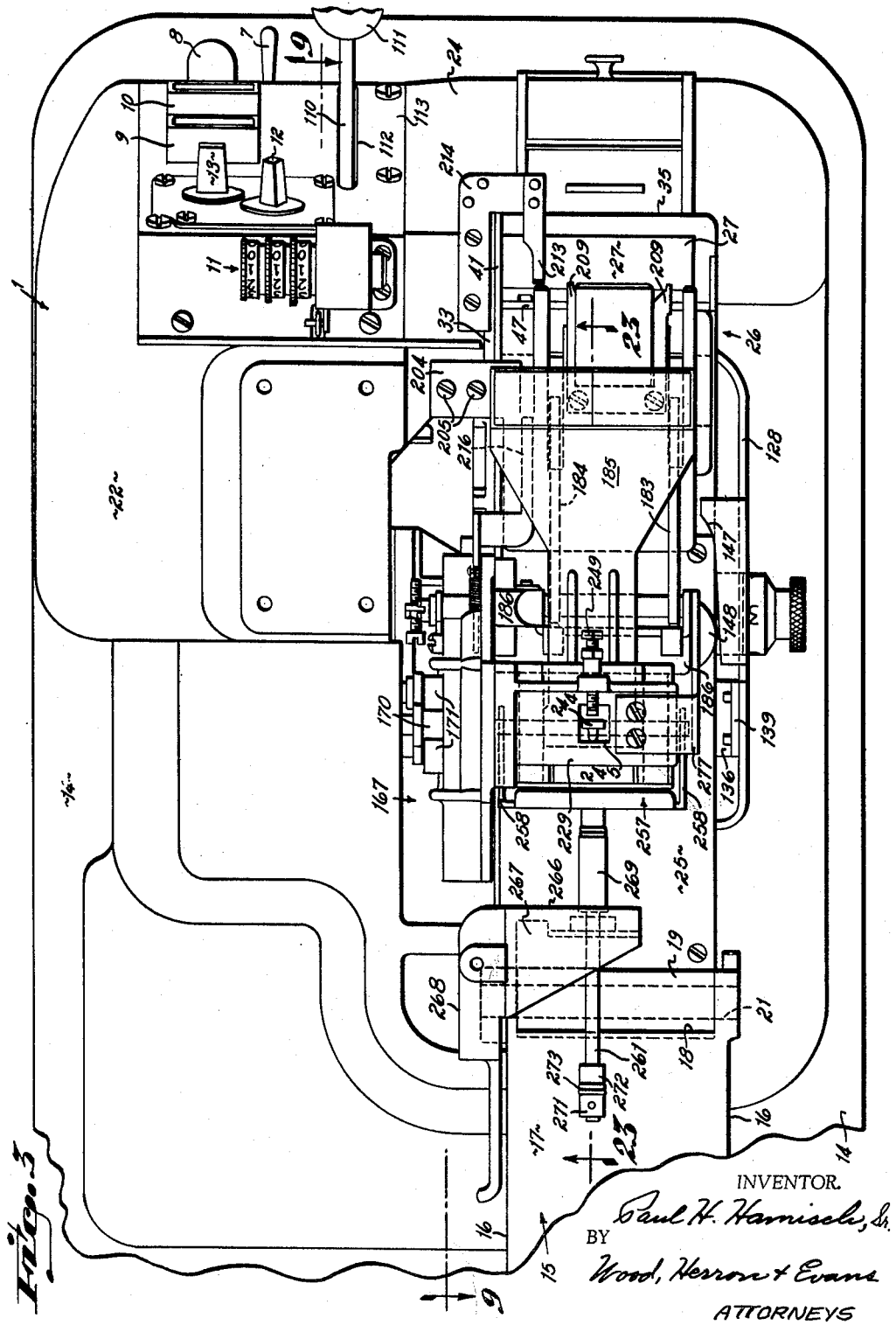

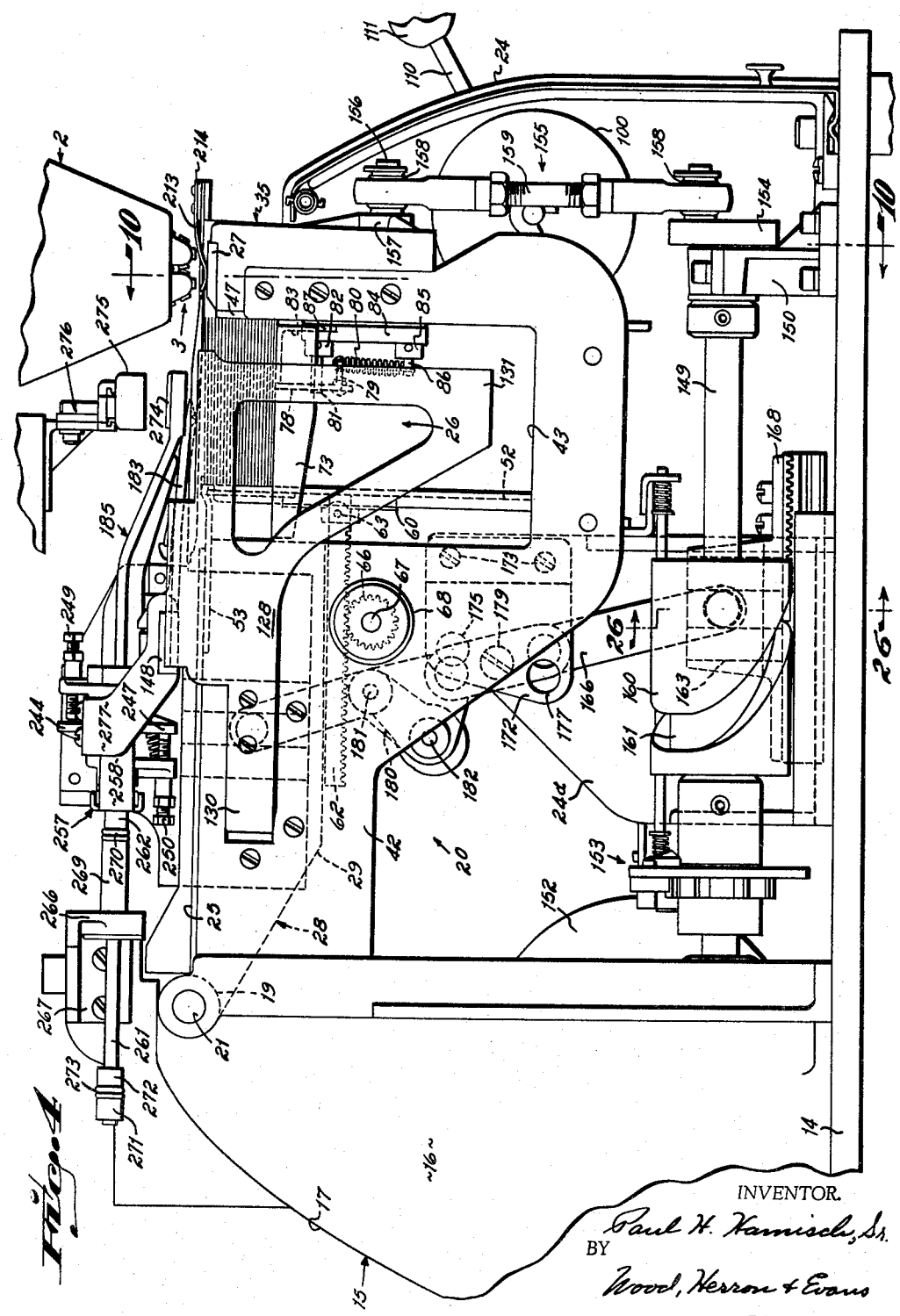

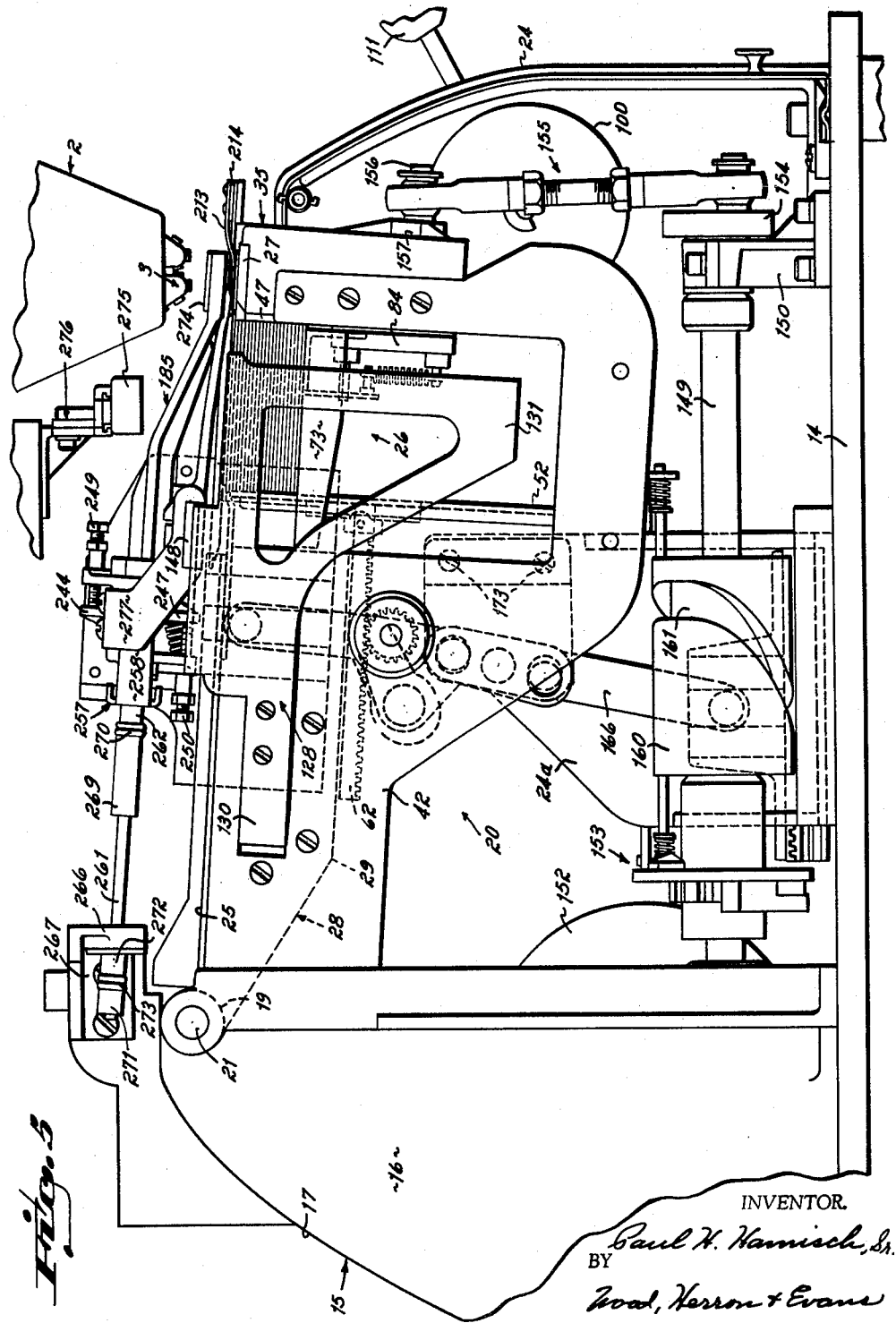

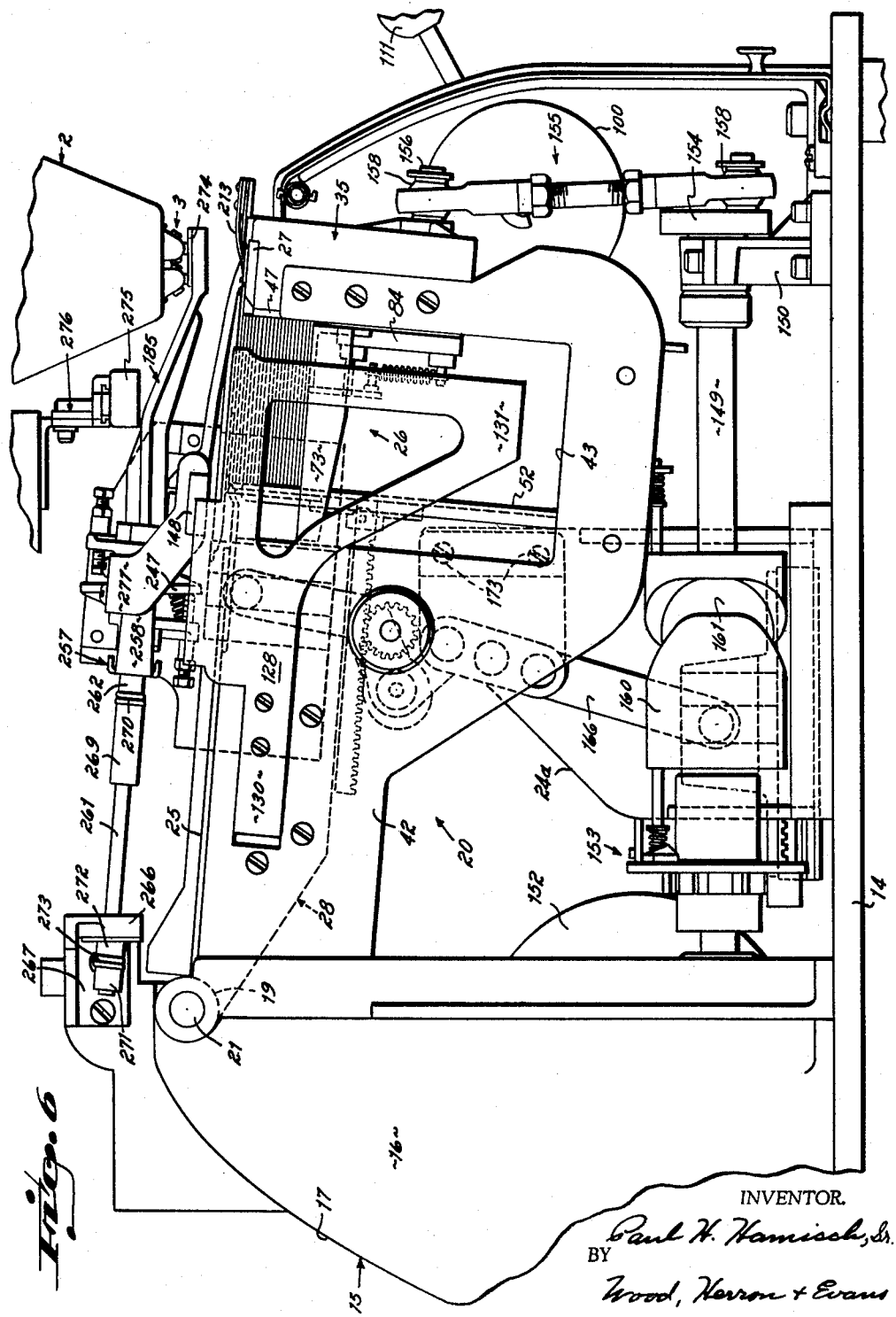

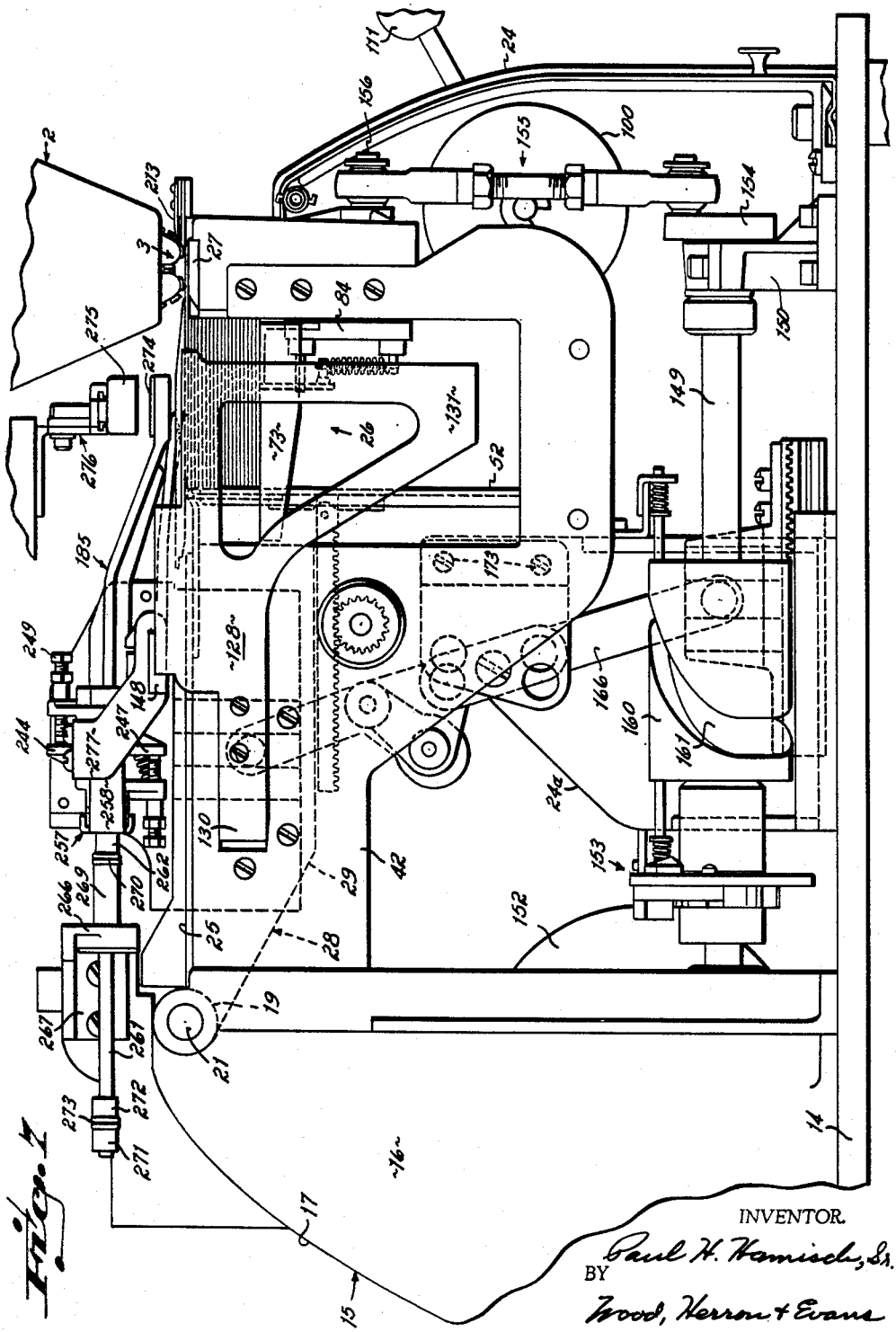

April 27, 1965　　　P. H. HAMISCH, SR　　　3,180,254
TAG MARKING MACHINE
Filed June 27, 1963　　　17 Sheets-Sheet 8
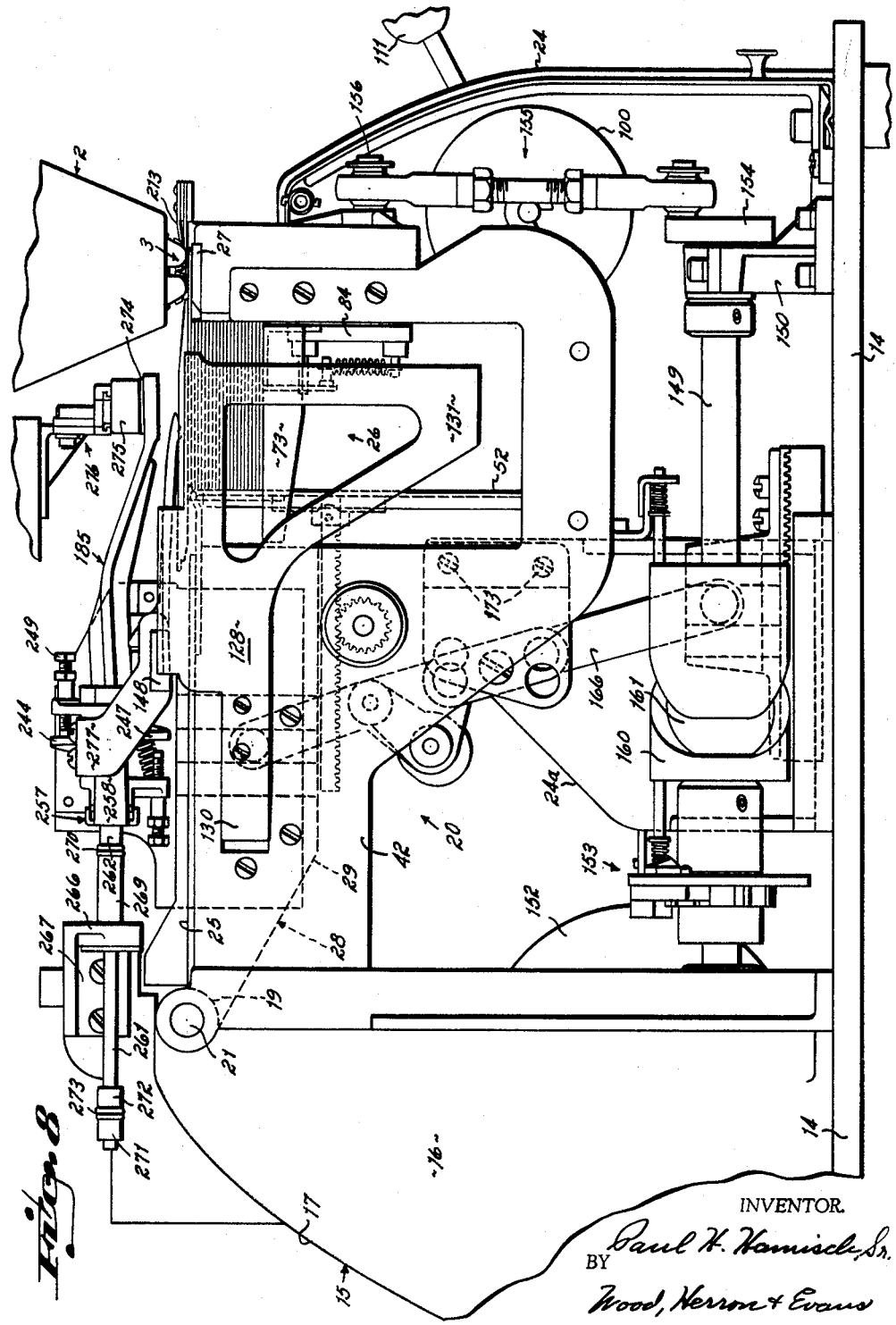
INVENTOR.
BY Paul H. Hamisch, Sr.
Wood, Herron & Evans
ATTORNEYS

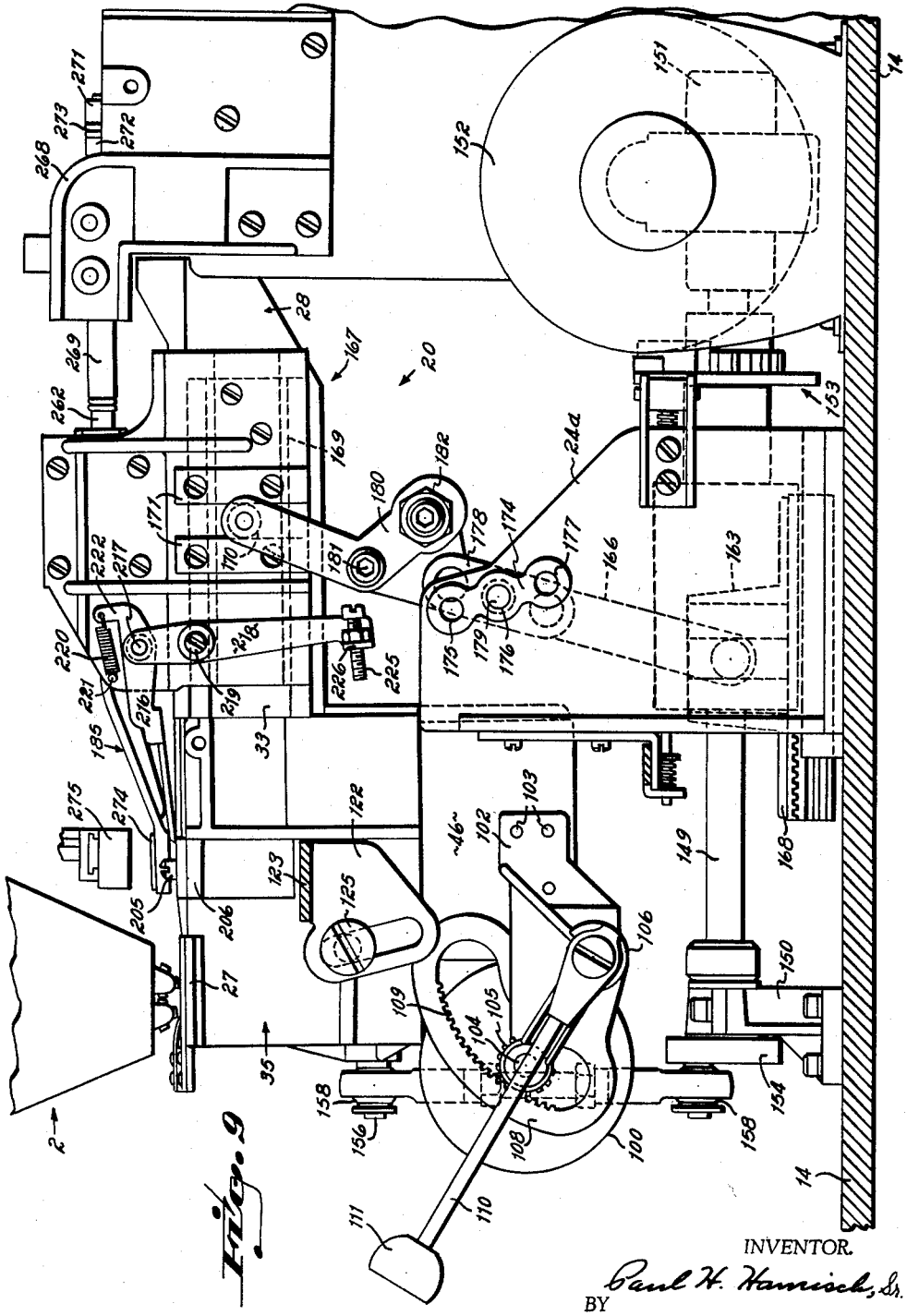

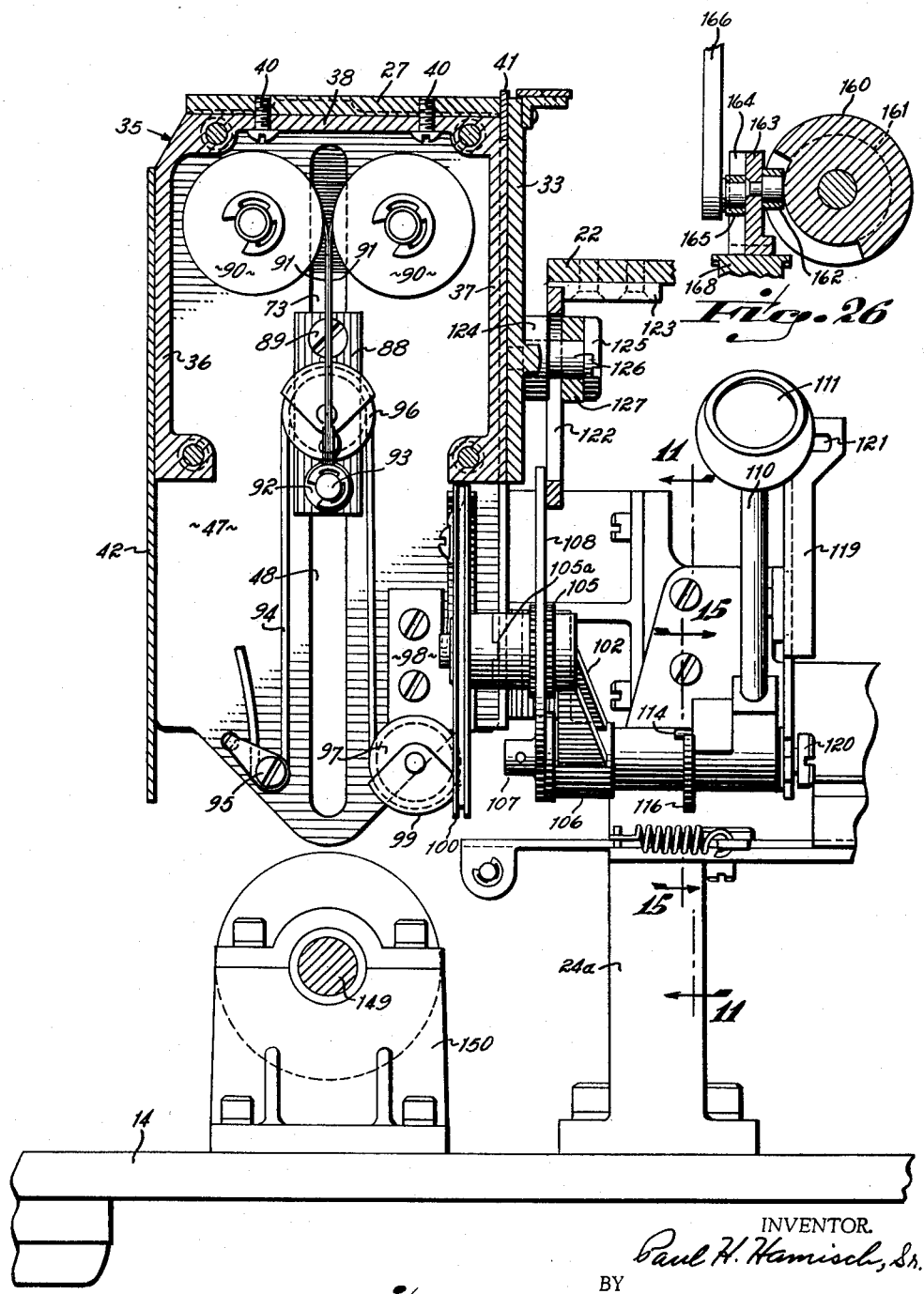

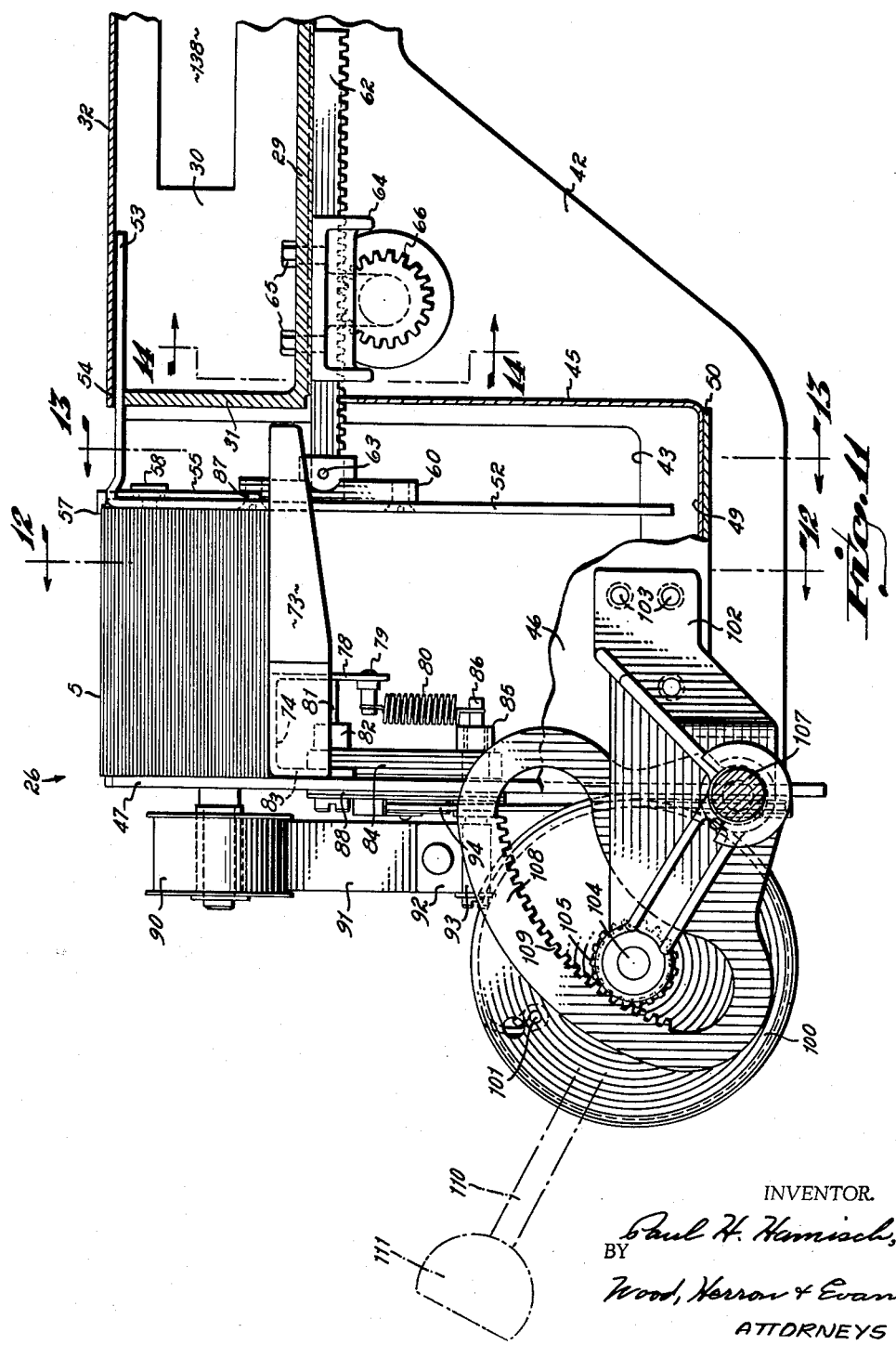

April 27, 1965
P. H. HAMISCH, SR
3,180,254
TAG MARKING MACHINE
Filed June 27, 1963
17 Sheets-Sheet 12
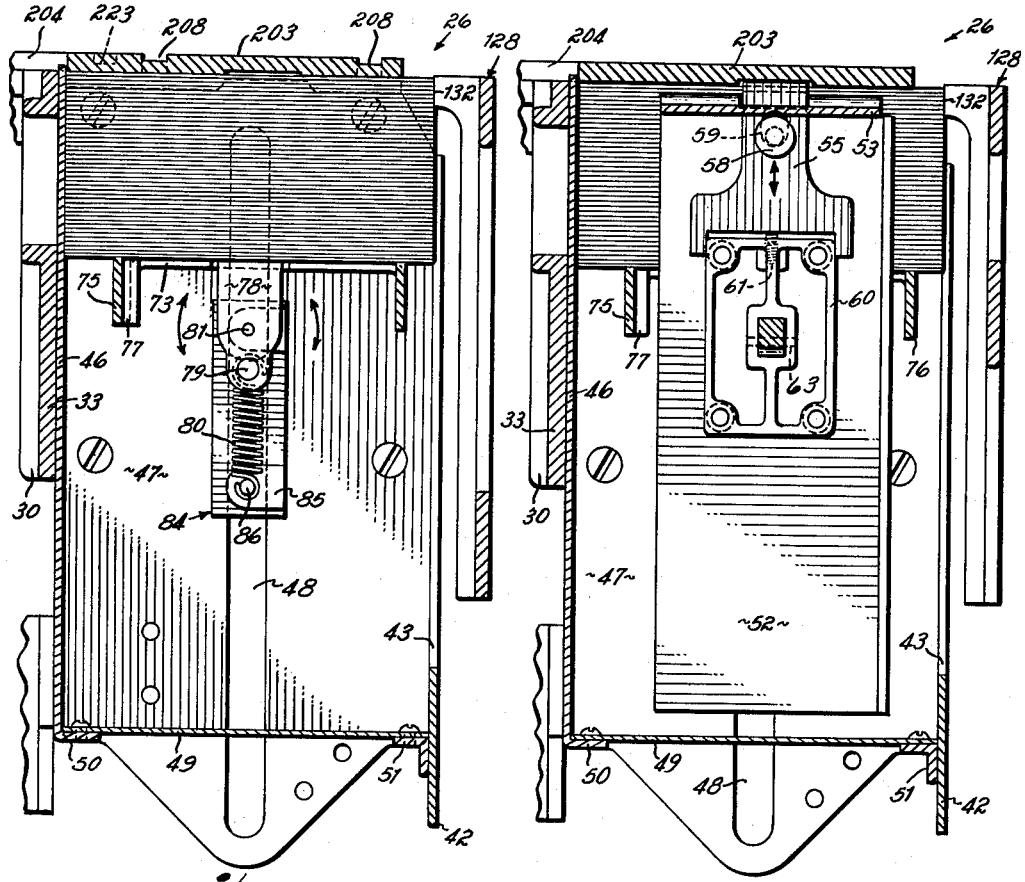
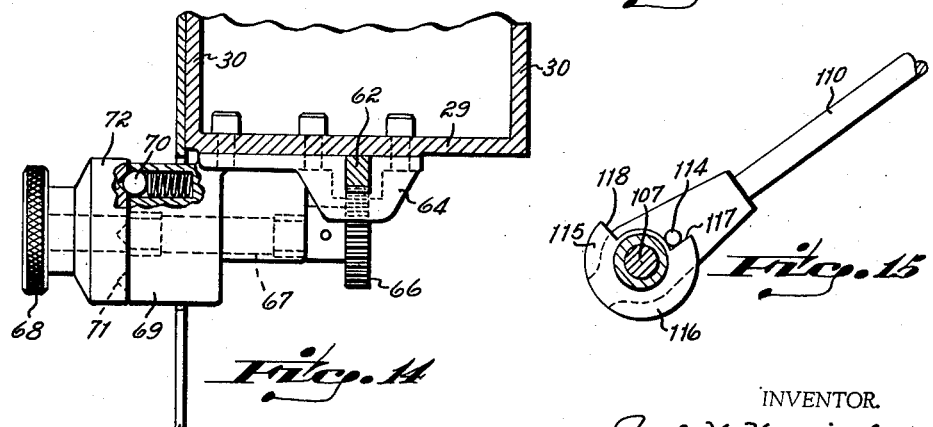
INVENTOR.
Paul H. Hamisch, Sr.
BY Wood, Herron & Evans
ATTORNEYS

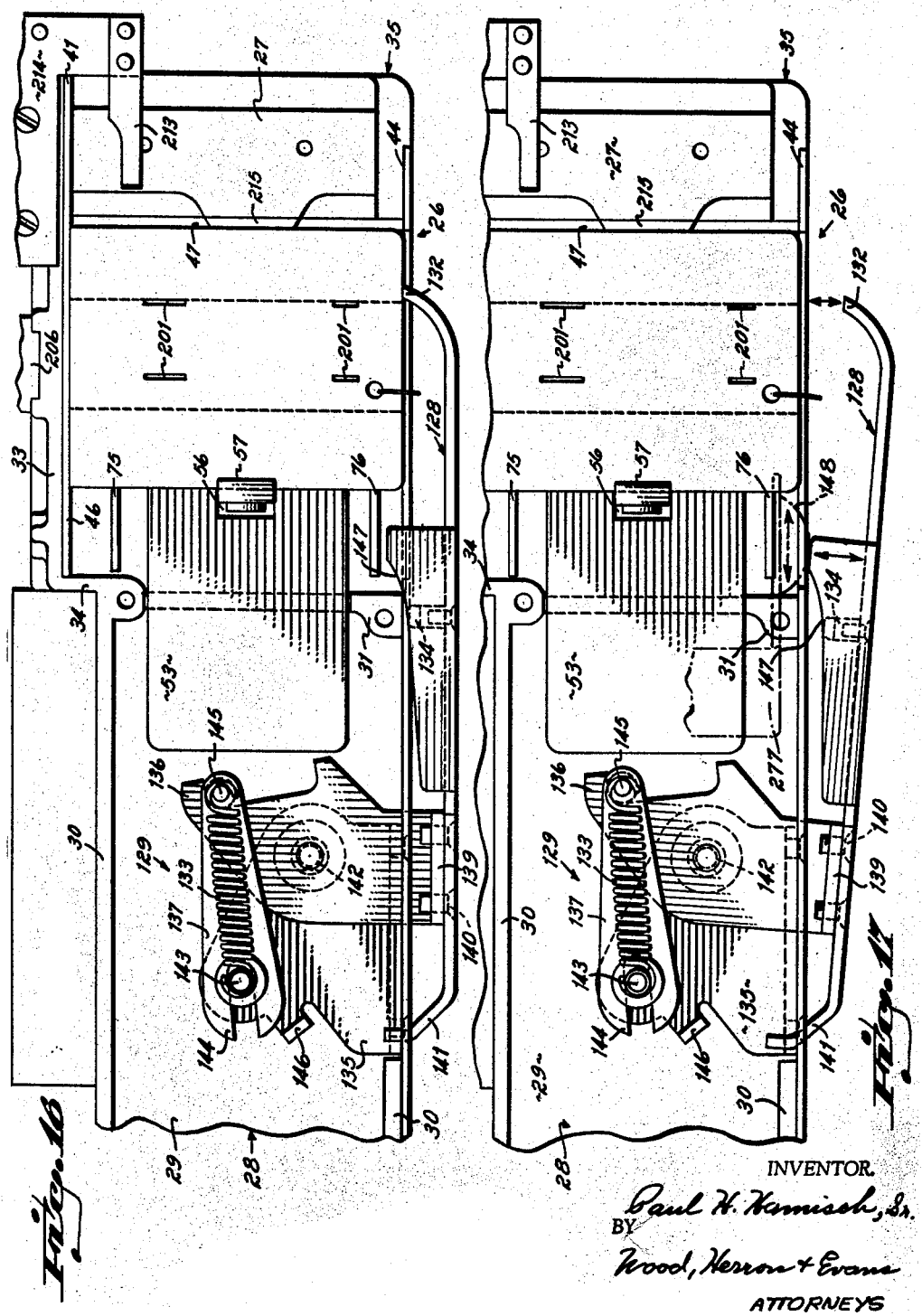

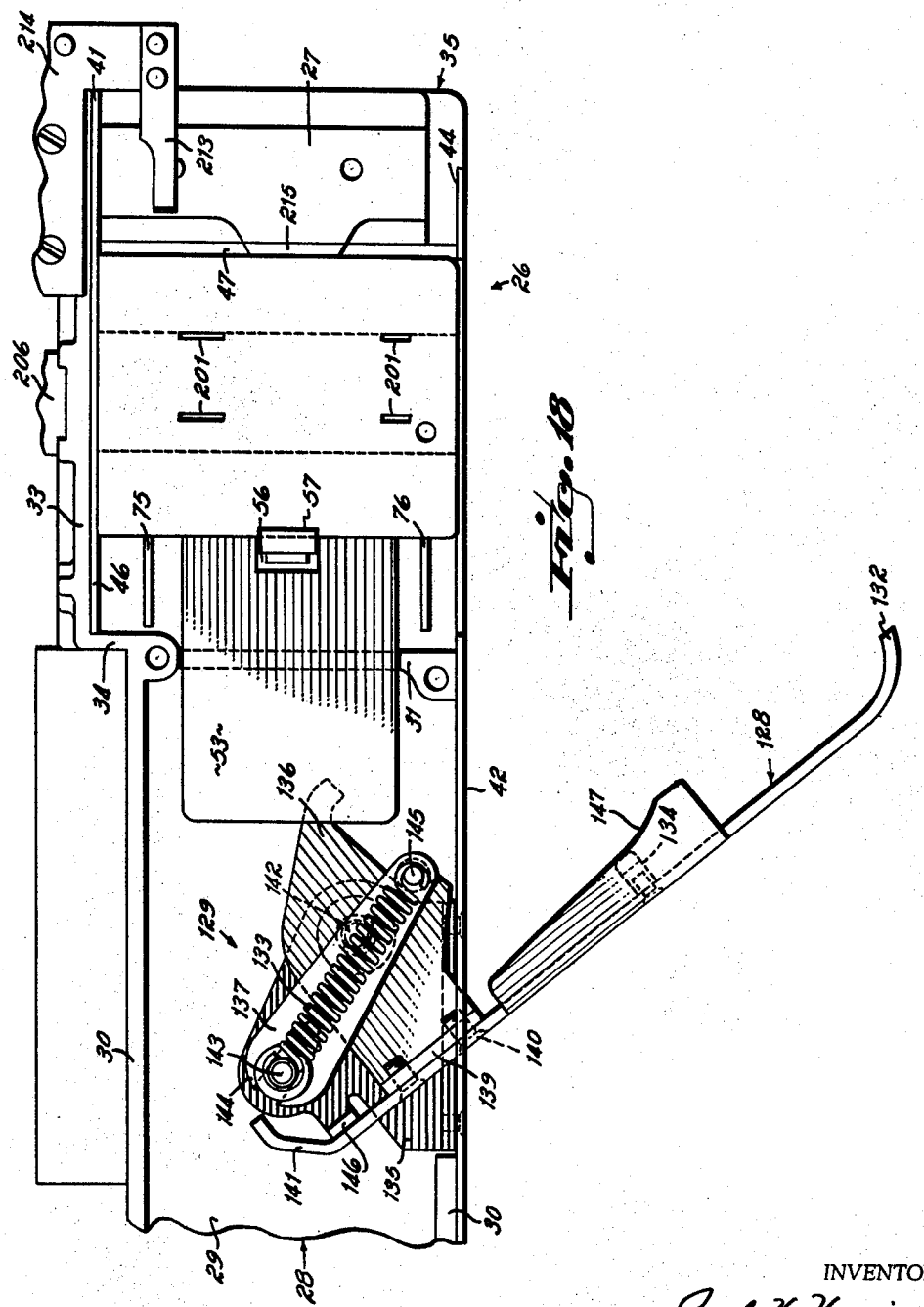

INVENTOR.
Paul H. Hamisch, Sr.
BY Wood, Herron & Evans
ATTORNEYS

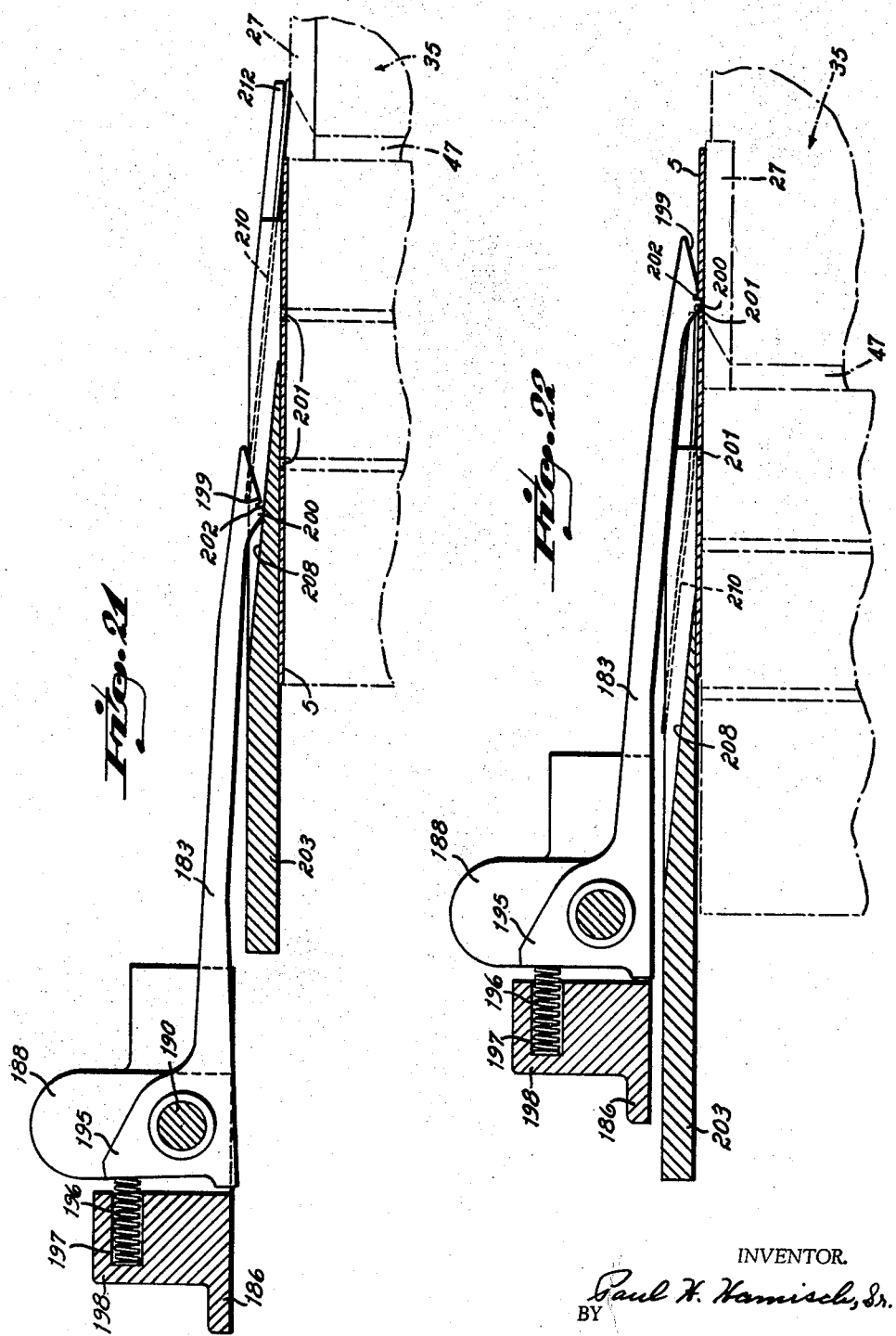

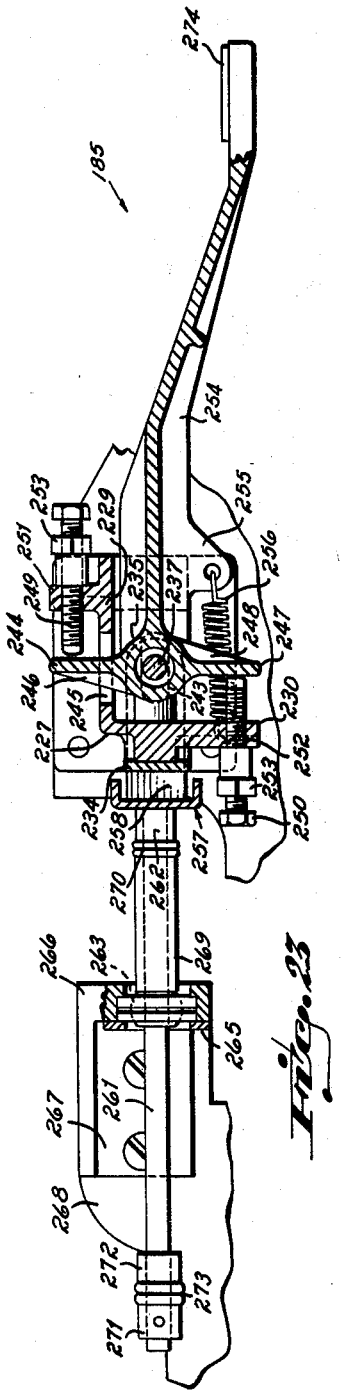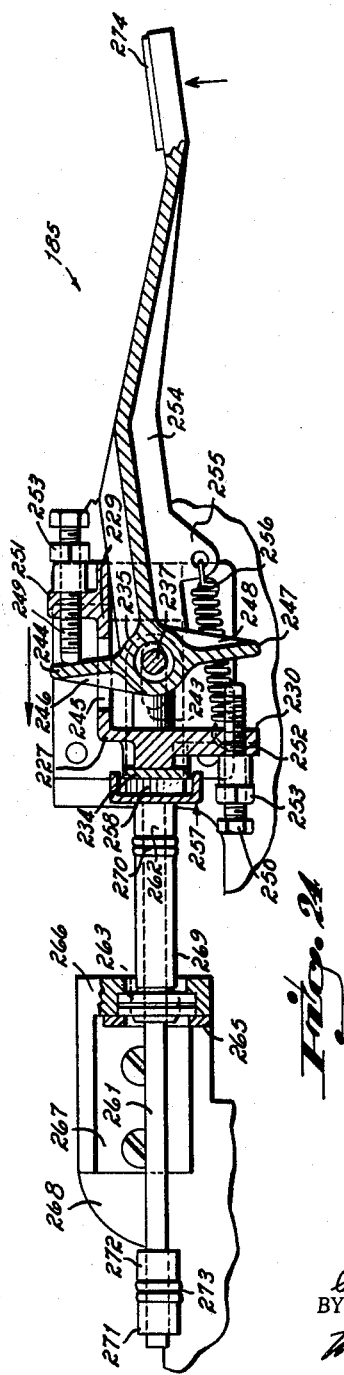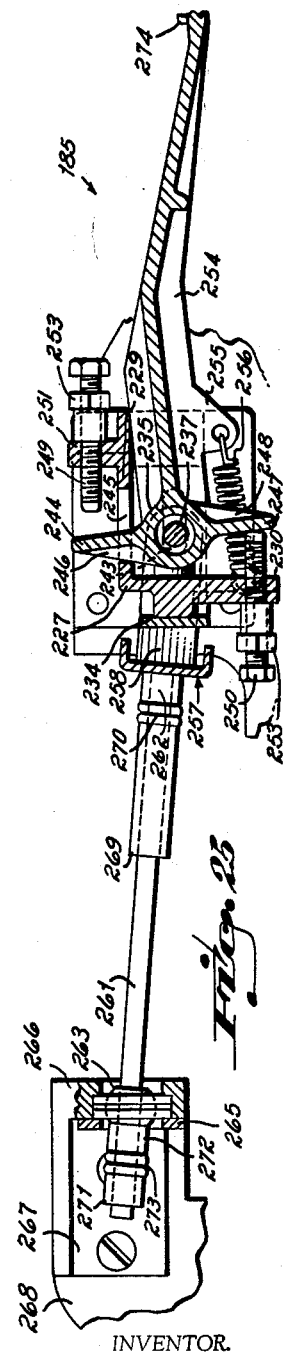

United States Patent Office 3,180,254
Patented Apr. 27, 1965

3,180,254
TAG MARKING MACHINE
Paul H. Hamisch, Sr., Dayton, Ohio, assignor to The Monarch Marking System Company, Dayton, Ohio, a corporation of Ohio
Filed June 27, 1963, Ser. No. 291,019
8 Claims. (Cl. 101—69)

This invention relates to price marking machines which are utilized to print prices and other information upon tags, tickets and labels. The machine of this invention is capable of handling, i.e., feeding, printing and dispensing, a variety of different types of tags, tickets and labels, including those provided in continuous strip form and those provided as individual entities. However, inasmuch as the demands placed upon the machine are greatest in the handling of those individual tags utilized in the ready-to-wear garment trade, the invention is disclosed primarily in relation to those features of the machine which are especially adapted for use in the handling of ready-to-wear tags. An identifying characteristic of these tags is that they are made up of one, two, three or more parts, with each part being adapted to carry a considerable amount of information in addition to price, and in the case of multi-part tags, each part repeating at least a substantial part of the information, if not all.

The use of data processing machines in the inventory, billing and other departments of stores has led to the use of coding systems, such as punched codes, readable by these processing machines. Thus, in many instances the tags carry coded information and printed information. Not all of the coded information need be printed upon the tag, but there is a desirable minimum of printing which has to be directly readable by store personnel and even this is considerable. The punched code information is applied by other machines. The machine of this invention is concerned only with the application of printed information.

The multi-part marking tags which are utilized in the machine of this invention comprise parts which are defined one from the other by serrated lines along which the parts are adapted to be torn one from the other at the time of a sale. One part of the tag is designed to remain with the garment as it goes into the hands of the purchaser to be used as identification in the event of a return of the garment. A second part may be desired for inventory control purposes. A third part may be desired for billing purposes. A fourth part may be desired by a department head or a buyer. Of course, the demand for different numbers of parts of individual tags may vary from department to department and from store to store.

Therefore, it has been one objective of this invention to provide a marking machine which is readily adaptable, with a minimum amount of adjustment and handling, to receive and operate upon multi-part tags of various widths.

It is inherent in the marking of ready-to-wear tags that the runs of tags carrying identical information be relatively short. To take a specific example, a dress of a popular style may be stocked in ten different sizes, several different colors, and there may be a price differential between the smallest and largest sizes. Assuming that only two of the smallest size are stocked, increasing numbers stocked through the intermediate sizes, and only one of the largest size stocked, it may be seen that a great number of short runs of tags must be printed with different size, color and price indicia in order to properly identify and price all of the dresses in this one style.

It therefore has been another objective of this invention to provide a marking machine in which changes in tags for different runs can be accomplished rapidly with a minimum of effort.

A further objective has been to provide a machine in which changes in the information to be printed upon the tags of different runs can be made rapidly and with a minimum of effort.

In a typical marking machine, provision is made to hold a supply of tags, there is a printing head and some means to ink the printing head, and there is also a mechanism to feed the tags from the supply to the printing head and then to a dispensing point. Basically, this requires three mechanisms—feeding, printing, and inking. In the past, these mechanisms have been individual systems of parts. In small machines, these individual systems have been adapted to be synchronized by utilizing simple interlinkages. However, in a machine of the size and complexity required in the marking room of a ready-to-wear store, the individual systems of parts, in the past, have required complex driving mechanisms and interconnecting linkages to insure correct sequence of operations and proper timing.

Thus, another one of the objectives of this invention has been to simplify what has been in the past a complex system of mechanisms and parts designed to fulfill the demands that are placed upon a machine of the ready-to-wear type, and to relate them in such a way that the three basic operations of feeding, printing, and inking are powered from one shaft, with this shaft being timed so that it makes one revolution for each part of a multi-part tag that is to be processed.

In many of the ready-to-wear marking operations a string tag is utilized. Tags of this sort pose special problems in a marking machine because the strings tend to become entangled and in the stacking of a number of these tags in a hopper, the ends to which the strings are attached stack higher than the ends having no strings on them. This latter problem increases with the height of the stack. A differential in the heights of the two sides of a stack is not particularly noticeable when only three or four tags are in the stack. When the stack is higher the problem becomes more acute, and it may be seen that as the tags are fed from the stack the problem of changing stack condition arises.

Thus, another objective of the invention has been to provide a marking machine in which provision is made to handle large stacks of string tags without entangling and in which provision is made to compensate for the differences in the heights of the two sides of a stack even under changing conditions.

Other objectives and features of the invention will be readily apparent to those skilled in the art from the following description of the drawings in which:

FIGURE 2 is a perspective view showing the side of the machine with the cover removed in order to show the driving mechanism.

FIGURE 3 is a fragmentary plan view of the top of the machine with the printing head removed and illustrating the tag feed mechanism.

FIG. 4 is an enlarged, fragmentary side elevational view of the machine with the cover removed illustrating details of the driving mechanism. In this view the various parts of the machine are shown in the "home" position.

FIGURE 5 is a view similar to FIGURE 4 in which the various parts of the machine have progressed from the home position in a tag feeding part of the cycle.

FIGURE 6 is a view similar to FIGURE 4 showing the parts in an advanced position in which the printing head is being inked.

FIGURE 7 is a view similar to FIGURE 4 showing the parts approaching a position in one cycle in which the ink pad of the machine is to be inked.

FIGURE 8 is a view similar to FIGURE 4 showing inking pad in a position in which it receives a new charge of ink. This figure illustrates the positions of the various parts of the machine just prior to their return to the condition of FIGURE 4 which is the "home" position and which designates the end of one cycle of operation.

FIGURE 9 is a fragmentary cross sectional view taken on the line 9—9 of FIGURE 3.

FIGURE 10 is a fragmentary cross-sectional view taken on the line 10—10 in FIGURE 4.

FIGURE 11 is a fragmentary cross-sectional view taken on the line 11—11 of FIGURE 10.

FIGURE 12 is a fragmentary cross-sectional view taken on the line 12—12 of FIGURE 11.

FIGURE 13 is a fragmentary cross-sectional view taken on the line 13—13 of FIGURE 11.

FIGURE 14 is a fragmentary cross-sectional view taken on the line 14—14 of FIGURE 11.

FIGURE 15 is a fragmentary cross-sectional view taken on the line 15—15 of FIGURE 10.

FIGURE 16 is a fragmentary view taken on a plane which passes through the machine just above the hopper, which is designed to receive the tags, and illustrating a gate mechanism.

FIGURE 17 is a view similar to FIGURE 16 illustrating the gate mechanism in a partially open condition.

FIGURE 18 is a view similar to FIGURES 16 and 17 showing the gate in a fully opened position.

FIGURE 21 is an enlarged cross-sectional view taken on the line 21—21 of FIGURE 20 and illustrating the feed finger mechanism in its retracted position.

FIGURE 22 is a view similar to FIGURE 21 illustrating the feed finger mechanism in an advanced position.

FIGURE 23 is an enlarged cross-sectional view taken on the line 23—23 of FIGURE 3 and illustrating the inking pad and its associated mechanism.

FIGURE 24 is a view similar to FIGURE 23 illustrating the inking pad and its associated mechanism in that part of the cycle in which the pad is in a raised position to receive a new charge of ink.

FIGURE 25 is a view similar to FIGURE 23 in which the feed finger and its associated parts are in positions to apply a charge of ink to the type of the printing head.

FIGURE 26 is a fragmentary cross-sectional view taken on the line 26—26 of FIGURE 4.

Figure 1:
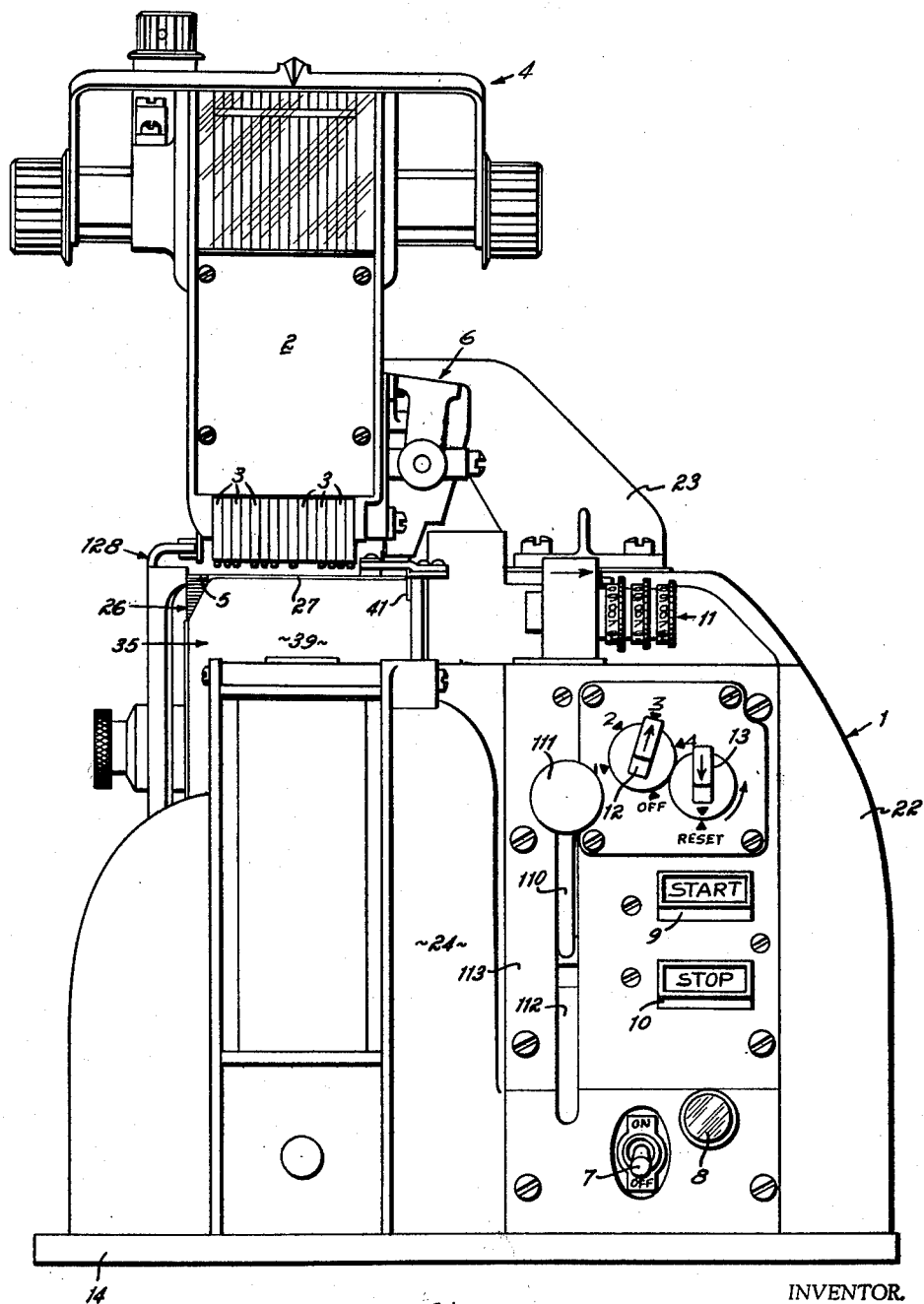
FIGURE 1 is a front elevational view of a tag marking machine incorporating the principles of this invention.

General reference is now made to FIGURE 1 which shows the front of a marking machine embodying the principles of this invention. The housing of the machine is designated generally by the numeral 1. Following conventional practices, this housing may consist of a number of removable sections in order to provide access to the interior of the machine. A printing head assembly is shown generally at 2. The specific construction of the printing head forms no part of the present invention. Generally, however, as shown, the printing head comprises two sets of fifteen individual flexible bands each band of which is identified at 3. In each set, the bands are arranged side-by-side and each band has printing characters on it. These printing characters may be selectively brought into printing position by means of a combined band selector and band rotating device, indicated generally by the numeral 4 which is provided for each set. Each band is divided into a lower sector carrying the printing characters which are arranged in sequence along the band and a plurality of readable characters which are arranged in the same sequence as the printing characters along the upper sector of the band. Thus, by bringing a readable character into a reading position at the top of the printing head the operator is assured that a corresponding printing character is in printing position at the underside of the printing head.

A stack of multi-part tags, the upper one of which is identified at 5 in FIGURE 1, are placed in the machine so that as viewed in FIGURE 1, the heads of the tags are toward the left and the bottom of the tags are toward the right. The two sets of printing bands are designed to print two lines of characters which read from the top toward the bottom on each part of the tag. There is, in addition, a price line printing unit 6, which preferably also has printing bands in it simliar to those in the printing head assembly, which are arranged to print price marking indicia across the foot of each part of the multi-part tags. Thus, in the operation of the machine the tags move, one part at a time, out of the machine toward the observer as viewed in FIGURE 1.

The machine illustrated has an on-off, master switch 7 and an indicator light 8 which comes on when switch 7 is on. Controls are provided for the machine including a start switch 9, and a stop switch 10. Stop switch 10 comprises a manual stop. There are in addition, two automatic stops one of which is controlled by a counter 11 and the other of which, to be described later, becomes effective when the last tag of a stack is fed from the machine. Counter 11 is similar to that type disclosed in United States Patent No. 2,622,804 which may be preset to a selected number, corresponding to the number of tags to be run. The counter is arranged such that it counts backwards from a preselected number toward zero and when reaching zero, functions to decommission the machine. One cycle of the machine consists of the feeding and printing of one part of a multi-part tag. Thus, for counting, provision must be made to preset the machine for operation with tags of various widths or parts. For this purpose, a knob to control such mechanism is shown at the front of the machine at 12. Four positions for this knob are shown corresponding to single width, two part, three part, and four part tag operations, plus an "off" position. This preset knob is used in conjunction with reset knob 13. The operation and interconnections of the counter, the control knob and the reset knob are disclosed in United States patent application Serial No. 346,240 filed February 20, 1964. For the present purposes, however, it is sufficient to state that the control knob 12 determines the complete tag count shown on the counter. Otherwise expressed, when the control knob 12 is set at one, which would be the setting for single width tags, the counter 11 makes one count for each cycle of the machine. In two part tag operation, the counter makes one count for each two cycles. In a three part tag operation the counter makes one count for each three cycles of the machine and so on, so that the counter does not tally cycles but tallies complete tags regardless of the number of parts of that tag from one to four.

The machine is mounted upon a base plate designated generally 14. This plate is rectangular with the four corners being rounded off for the sake of appearance. There are four frame members in the machine that are of cast construction. Three of these are exposed to the outside and they follow generally the contours of the cover plates as will be explained. The fourth frame member is enclosed within the machine. More specifically, a frame member designated 15 is at the left rear of the machine and it comprises two side walls 16—16 and a wall 17 that is curved for the sake of appearance and that constitutes both a back and a top wall. The forward portion of wall 17, at the top of the frame member, is cut out as at 18 to accommodate a journal sleeve 19 that is an integral part of a hopper-platen assembly designated generally by the numeral 20. Journal sleeve 19 is pivotally mounted upon a shaft 21, the ends of which are appropriately journalled in the upper portion of the two side walls 16—16 of frame member 15. As shown in FIGURE 2, the forward part of the side walls are reinforced by added metal. In addition, following known practices, all frame members may have ribs in order to strengthen them in crucial areas and appropriate flanges are provided in order to bolt the frame members to base plate 14.

Another one of the three outer frame members is shown at 22 in FIGURE 3. This is the largest one of the frame members and it is well stressed, using known techniques, because it carries a bracket 23 which mounts the printing head 2 in cantilever fashion. The third outer frame member is shown at 24 and it is centered at the front of the machine. The fourth cast frame member is shown in FIGURE 2 at 24a and it provides a support for drive and control members as will be explained. Following known techniques, the three outer frame members are joined by removable cover plates which protect the working parts of the machine and which add to the overall appearance of the machine.

The hopper-platen assembly 20 is pivotally mounted at the rear on shaft 21 for a rocking movement in which its front end has limited up and down swinging movement. Thus, in this machine, the printing head is stationary and tickets to be printed are carried by the assembly up into a position in which they are impressed by the type carried by the printing head.

More specifically, the hopper-platen assembly comprises generally a table 25 at the top over which labels and tags in strip form are adapted to be fed toward the printing head, a hopper designated generally 26, which is toward the front of the assembly and in which ready-to-wear tickets are placed, and a platen 27 on which the tags, tickets and labels reside during printing. The main frame member of assembly 20 is in the form of a casting 28 which includes the journal sleeve 19. Generally, this casting is box-shaped having a bottom wall 29 and two side walls 30—30. The bottom wall 29 slants upwardly to the journal sleeve 19 at the rear as shown in dotted lines in FIGURES 4–8. The forward end of the box-like casting 28 is closed by a wall 31, and the top is closed by a plate 32, which is appropriately bolted in place to the frame, this plate forming part of table 25. Bottom wall 29 and forward wall 31 are best illustrated in FIGURES 11 and 14. The two side walls 30—30 are best illustrated in FIGURES 14 and 16–18. As will be seen, the forward wall 31 is at the back of hopper 26. There is in addition an extension of the side wall of casting 28 at the right. This extension is designated 33 and may best be seen in FIGURES 9, 10, 13, 16 and 18, it is offset outwardly, as at 34, toward the right from side wall 30 in order to accommodate hopper 26 and in addition it depends below the bottom wall 29 in order to provide support for mechanism at the forward end of the assembly, as will be explained.

A hollow box-like casting 35 is secured to the forward end of extension 33. This casting includes two side walls 36 and 37, a top wall 38 and a forward wall 39. Side wall 37 which is toward the right as viewed from the front may be secured by means such as bolts to the extension 33 or it may be cast as an integral part of it. The upper surface of casting 35 is machined to provide a flat seat for platen 27, the platen being bolted in place by means of machine screws 40—40 as shown in FIGURE 10. Also as shown in this figure, casting 35 has a slot in it to accommodate the forward end of a guide strip 41 against which tickets to be printed slide as they are fed onto the platen. The left side of the hopper-platen assembly carries a plate 42 which is cut out as shown at 43 in FIGURE 2 to expose the hopper 26. The plate 42 extends forwardly under the platen and at the front of the hopper it is secured by means such as bolts to a seat 44 machined in the side of casting 35 as may be seen in FIGURES 16 and 17. In the rearward portion, plate 42 covers the casting 28 being removably secured to it for maintenance and adjustment purposes by means of machine screws.

A shown in FIGURES 11 and 18, the forward wall 31 of casting 28 is coextensive with a back wall 45 of the hopper 26. Wall 45 is also coextensive with a wall 46 which forms the right side of the hopper, this wall being secured to the extension 33 in the area thereof to the rear of the box-like casting 35 that forms the forward end of the hopper-platen assembly. Additionally, the upper part of right wall 46 extends forwardly beyond the hopper area to provide the guide strip 41 to which reference has been made. The extension of the wall 46 is best seen in FIGURE 18. The front side of the hopper is defined by a vertical wall 47 which is fastened by means such as machine screws to the rear of the box-like casting 35. This is best shown in FIGURES 10 and 12. However, the wall 47 extends downwardly considerably below the casting 35 and its lower edge is substantially V-shaped. Wall 47 also has a vertical slot 48 which extends substantially the full height of the wall, the purpose of this slot to be explained later. The bottom wall of the hopper is formed by a plate 49 which is fastened to a flange 50 turned over at a right angle from the lower edge of wall 46 at one side thereof and fastened to a right angular flange 51 at the other side edge thereof. The latter right angular flange is secured to the plate 42 which extends along the left face of the hopper-platen assembly.

Tickets within the hopper are held against the forward wall 47 by means of a pusher plate 52 which is adjustable from the front to the rear of the hopper into any one of four positions so as to accommodate tickets having from one to four different parts. As may be seen in FIGURE 11, the upper part of pusher plate 52 is turned over at a right angle to provide a rearward extension 53 that passes through a slot 54 at the upper edge of forward wall 31 of the box-like casting 28 to immediately underlie the plate 32 that constitutes a table. Although plate 32 is removed in FIGURE 18, it can be seen that the extension 53 constitutes an extension of the table on which tags and labels in strip form may be fed toward the platen from the rear of the machine.

A spring urged latch member 55 is carried at the top of the pusher plate 52 and its function is to hold the uppermost one of a stack of tickets within the hopper from being pulled to the rear during the retracting movement of the feed fingers of the machine which are to be described later. The upper end of the latch member 55 projects through a rectangular opening 56 at the top of the pusher plate 52 and it is turned over toward the front of the machine to provide a thin edge 57 which rests on top of the uppermost ticket within the hopper. A large headed rivet 58, which is fastened to the pusher plate 52 adjacent to its upper edge passes through a slot 59 in latch member 55 to hold it in place while permitting a slight amount of vertical movement for this member. As shown in FIGURE 13, the lower end of latch member 55 straddles the upper end of a cast block 60 and a small coil spring 61 seated in a bore at the top of block 60 normally urges the latch member 55 into the elevated position shown. This is a very light coil spring, serving merely to counter-balance the weight of the latch member 55 so that when the tags and labels in strip form are being fed across the table, the upper end of the latch member can be depressed by the strips so as to not interfere with their movement, it being assumed that when strips are being fed no tickets would be in the hopper to hold the latch member in the elevated position shown.

The cast block 60 is fastened to the rear face of the pusher plate by flat headed machine screws which are counter-sunk in the forward face of the pusher plate 52. The central part of the cast block 60 is configured to provide a seat for the forward end of a gear rack bar 62, the rack bar being fastened in the seat by means such as a cross pin 63. The gear rack bar 62 extends rearwardly through an opening in the rear wall 45 of the hopper and it is slidingly enclosed, in a position in which it is slidable along the bottom face of the wall 29, by means of a journal block 64 which is bolted as shown in 65—65 to the wall 29. The journal block 64 and wall 29 thus hold the rack bar in alignment and carry the weight of pusher plate 52. Rack bar 62 is engaged by a pinion 66, the pinion being pinned to the inner end of a shaft 67 carrying a knurl control knob 68 at its outer end. Shaft 67 passes through a barrel 69 in which a ball spring detent 70 is seated. The ball of the detent is engageable in one of four notches 71 drilled into the inner face of a collar 72 which is formed as an integral part of the knurl knob 68. The notches are located around the collar in positions corresponding to positions of pusher plate 52 as dictated by the various widths of the multi-part tickets adapted to be accommodated in the hopper. As shown, barrel 69 and journal block 64 are cast integrally. It may be seen therefore that when a stack of tickets is placed in the hopper, the knob 68 may be turned to a position which places the pusher plate against the rear edges of all tickets to align them vertically.

The tickets within the hopper rest upon a table 73 which is mounted so that it can rock from side to side in order to accommodate the uneven stacking characteristics of string tags. As best shown by the dotted line at 74 in FIGURE 11, the top of the table is just slightly deeper than the width of a single width ticket. The two sides of the table are turned down to provide arms 75, at the right, and 76, at the left, which project rearwardly, terminating just short of the rear wall of the hopper. These arms clear the sides of pusher plate 52. Arm 75 at the right has an offset 77 in it for clearance purposes. A tab 78 is turned down from the rear edge of table 73, the lower end of this tab mounts a pin 79 which extends forwardly from it. The upper end of a coil spring 80 is engaged on pin 79. Just above pin 79 there is a bore in the tab 78 which journals the rear end of a pivot pin 81. This pivot pin passes through a boss 82 and it is also engaged in a tab 83 which is turned down from the forward edge of the table paralleling the tab 78. Boss 82 is formed as a part of a cast block which is a part of a slide block designated generally by the numeral 84. This block has a second boss 85 at its rear which parallels boss 82, the latter boss being at the bottom of the slide block. This latter boss mounts a pin 86 to which the lower end of coil spring 80 is connected. The block 84 is cut out as at 87 in order to accommodate the tab 83. It may be seen therefore that the mechanism just described provides a pivot for rocking movement about the center of pivot pin 81 and it also provides spring means tending to bring the top of the table with its arms 75–76 into a level position. Therefore, the table provides support for an uneven stack of string tags and the spring automatically adjusts the level of the table as the stack grows shorter, because, as will be seen, the table 74 is constantly urged toward the top of the hopper by mechanism now to be described.

The slide block 84 has a projection (not shown), which is narrower than the block itself and which is slidingly engaged in the vertical slot 48 in the plate 47 which forms the front wall of the hopper. Another block, designated 88, the same width and height as block 84, is provided at the front of the slot, being fastened to slide block 84 through slot 48 by counter-sunk machine screws 89. Two "Negator" spring assemblies 90—90 are affixed to the front of wall 47 adjacent the upper end thereof and at points equally spaced from the sides of slot 48. The assemblies are positioned such that their spring steel bands 91—91 are coextensive and centered with respect to slot 48 as shown in FIGURE 10. The lower ends of both bands are fastened to a collar 92 which is mounted on a pin 93 projecting forwardly from the lower end of block 88. A "Negator" spring assembly is characterized by exerting a constant tension regardless of the amount the bands are extending and it is this constant tension, in an upward direction, that is transmitted to rockable table 73. It is to be noted in FIGURE 10 that the "Negator" spring assemblies are hidden within the hollow cast block 35 which is at the front of the hopper-platen.

Means are provided to depress the table, against the tension of the "Negator" spring assemblies from the front of the machine, so that it is not necessary for the operator to reach with both hands around to the side of the machine to both depress the table, using one hand and insert a stack of tickets in the hopper, using the other hand, this being an awkward movement. The means provided includes a thin cable 94 which has one end secured to wall 47 adjacent to the left side of slot 48 by means of a screw lock 95. The cable extends vertically, paralleling slot 48 and then around a small pulley wheel 96 which is rotatably journalled at the center of block 88. As shown, an arcuate shield is provided on pulley wheel 96 to prevent the cable from jumping from the groove in the wheel. The cable then continues passing vertically downwardly, paralleling slot 48, and around a second pulley wheel 97 which is mounted near the lower end of wall 47 by means of a bracket 98 fastened by means of screws to wall 47. In this case a shield 99 is provided for the lower part of pulley wheel 97 about which the cable passes. From here, the cable again turns upwardly entering the groove of a large pulley wheel 100 which is set at a right angle to pulley 97, and which is relatively positioned such that the cable is tangent to the grooves in both pulleys 97 and 100. The pulley 100 is sufficiently large so that the cable extends less than 360° of its circumference when the table 73 in hopper 26 is in its fully elevated position. A screw lock shown at 101 secures the end of the cable to pulley 100.

As shown in FIGURE 11 a mount bracket 102 of cast construction is provided that is rigidly affixed to the wall 46 by means of screws 103. Mount bracket 102 is adjacent the lower end of wall 46 and it extends generally forwardly to provide a bore into which shaft 104 is securely riveted. Pulley 100 and a gear 105, being locked together by a key 105a, are free to turn on shaft 104. The mount bracket 102 provides a journal 106 for a shaft 107 to which is keyed a drive element 108 having an internal, arcuate gear rack 109 formed in it that is in engagement with the gear 105. A handle 110 having a knob 111 at its outer end is rotatably journalled, as illustrated in FIGURE 15, on the shaft 107. The handle 110 passes through a slot 112 in a cover plate 113 at the front of the machine. (See FIGURE 1.) The lower part of the control handle, adjacent to shaft 107, has a drive pin 114 projecting from the left side thereof. The drive pin 114 is engageable with a segment 115 of a sleeve 116 that is keyed to the shaft 107. Segment 115 provides a radially disposed abutment 117 against which drive pin 114 normally rests. The segment is cut out to another radially disposed abutment 118 so that the handle can be swung up and down to move drive pin 114 any place within the cut out area without causing any turning motion of the drive element 108 carrying the arcuate gear rack 109. However, when the handle is depressed and the drive pin 114 is brought into contact with the radial abutment 117 of segment 115, the gear rack 109 swings down. This drives the gear 105 and the large pulley wheel 100 in the counterclockwise direction as viewed in FIGURE 11, which winds cable 94 onto the large pulley wheel. This causes slide block 84 to move downwardly in slot 48, thereby lowering the table for loading tickets into the hopper. The release of the handle from its depressed position permits the "Negator" spring assemblies to pull slide block 84 upwardly to elevate the table until it makes contact with the lowermost one of the tickets in the hopper. The cut out area in segment 115 between the radial abutments 117 and 118 prevents an operator from turning the large pulley wheel 100 by raising the handle 110 when the hopper table 73 is depressed and thereby cause the cable 94 to become slack and possibly entangled. In the embodiment shown the "Negator" springs maintain the cable under constant tension.

It is to be noted that the bracket 102 and all of the parts that it mounts, including the handle 110, move up and down with the reciprocating motion of the hopper-platen assembly. For this reason, the slot 112 in the front of the machine must not only accommodate the full throw of the handle 110 to lower table 73 but it must accommodate the reciprocating motion of the handle. In passing it is to be noted that there is a link 119 that is fastened, by means of a large headed bolt 120, to the right side of the inner end of the handle 110. The upper end of this link has a slot 121 in it that is connected to the counting mechanism to which reference has been made and which is fully disclosed in copending patent application, Serial No. 346,240, filed February 20, 1964.

The only support previously discussed for the entire hopper-platen assembly is the shaft 21 mounted in frame member 15 and engaging journal sleeve 19. There is, in addition, a guide for the front part of the hopper-platen assembly designed to prevent sidewise movement. This takes the form of a slotted bracket 122 which is affixed to the underside of the part of frame member 22 from which the bracket 23 supports printing head 2 in cantilever fashion. As shown in FIGURE 10, slotted bracket 122 is generally vertical but it has a right angular base flange 123 that is tightly bolted to the underside of frame member 22. Preferably, the bolts pass through elongated holes (not shown) in the base flange 123 to provide movement for initial adjustment to correctly position slotted bracket 122. A circular boss 124 is cast as an integral part of the extension 33 of the body casting 28 of the hopper-platen assembly. A large headed bolt 125 having a cylindrical shank 126 passes through a collar 127 and the slot in bracket 122. The collar 127 and boss 124 engage the opposite sides of bracket 122 at the sides of the slot within the bracket in slip-fit relation, thus preventing any sidewise movement to occur in the hopper-platen assembly during operation.

The uneven way in which string tags stack creates an alignment problem which is solved in the machine of this invention by a hopper gate designated generally by the numeral 128. The mount 129 for the gate is situated within the cast body 28 of the hopper-platen assembly. The gate itself extends along the left side of the machine and it includes, in general, an arm portion 130 at the rear and a triangular hopper guard portion 131. The guard portion is cut out as shown at FIGURE 2 to primarily lighten the forward end of the gate. At the top forward end, the gate is turned over on an arc to provide a tamper 132 which, with the gate closed, rests against the edges of the upper ones of the tickets within the hopper. In this position, the tickets are correctly positioned for feeding purposes, being against the guide 41. This position is shown in FIGURE 16. A coil spring 133 associated with the mount for the gate pulls the tamper into contact with the edges of the tickets. A small abutment post 134 shown in dot dash lines in FIGURES 16 and 17 contacts side plate 42 to limit the inward movement of the tamper.

The mount 129 consists of three parts comprising a base bracket 135, a leaf 136 and a toggle link 137. The side plate 42 is cut out as at 138, see FIGURE 11, to accommodate the mount. Just inside of the cut out 138 a flange, turned down from the edge of base bracket 135, is securely riveted or otherwise fastened to plate 42. Leaf 136 projects through the opening 138 and a right angular flange 139 is turned upwardly and fastened by means of countersunk screws 140 to the inner face of the arm portion 130 of the gate. As shown in FIGURES 16 and 18, the rear end of the arm portion 130 is angulated inwardly as at 141 to provide a closure for the rear part of the opening 138. The leaf 136 is pivotally mounted by means of a stud 142 onto base bracket 135. A pin 143 on base bracket 135 is straddled by the slotted end 144 of the toggle link 137. The other end of the toggle link is pivotally fastened to the inner end of the leaf 136 by means of a pin 145. The coil spring 133 has its opposite ends engaged around the respective pins 143 and 145. As shown in FIGURE 16, the spring is aligned relative to the pivot 142 for the leaf 136 such that the tamper at the forward end of the gate is spring urged into contact with the tickets. However, when the gate is swung to the fully opened position shown in FIGURE 18, the longitudinal axis of the spring 133 is over-center with respect to an imaginary line connecting pivot 142 and the pin 143 on the base bracket. The gate is thus held in open position by the tension of the coil spring 133 in this over-center position. An abutment 146 on the base bracket contacts the inside of the arm portion of the hopper gate to provide a stop for the gate in this position. A continuation of the upper edge of the gate is turned over toward the plate 42 to provide a flange having an arcuate cam surface 147 on it and this cam surface is adapted to be engaged by a rider block 148 (shown in dot dash lines in FIGURE 17). This rider, as will be explained, is attached to the feed finger carriage and it reciprocates with the feed fingers making one forward and one backward movement during each cycle of the machine. As the rider 148 comes forward, it strikes cam surface 147 and this moves the tamper out away from the edges of the tickets, thus providing an opening through which the string of the ticket being fed can pass. Upon the return of the rider 148, the gate is free to swing in to bring the tamper into contact with the edges of the ticket under the action of coil spring 133. Thus, during each cycle of the machine, the upper ones of the tickets in the stack in the hopper are tamped inwardly which insures that they are in proper alignment in contact with the guide 41.

The machine of this invention has but a single drive shaft which is designated 149 and it extends from the back to the front of the machine underneath the hopper-platen assembly. Adjacent to its forward end, the drive shaft is journalled in a bearing block 150 that is bolted to the base of the machine. The rear-end of the shaft is journalled in a speed reduction housing of known type shown in dot dash lines at 151 in FIGURE 9. The speed reduction housing is associated with and the gears within it are driven by means of a fractional horse power electrical motor 152. Shaft 149 is broken at a one cycle clutch 153 of known design that is characterized in that when it is tripped, it disconnects at the end of that cycle in which it is tripped. Two driving elements are carried by shaft 149. One is a crank 154 that is keyed to the forward end of the shaft in front of bearing block 150. This crank is connected by means of an adjustable crank arm 155 to a drive pin 156 that is rigidly mounted in a boss 157 cast as an integral part of the box-like casting 35 that is at the forward end of the hopper-platen assembly. Ball socket connections 158—158 of conventional design connect the ends of the crank arm 155 to the drive pin 156 and the arm of crank 154. The overall length of the crank arm is adjustable by providing left and right hand threads at the opposite ends of a link 159 in the crank arm. The link threads into the upper and lower ends of the crank arm with lock nuts being provided to insure tightness. It will be seen therefore that one revolution of the drive shaft 149 results in one up and down cycle of rocking movement for the hopper-platen assembly.

The other drive element on shaft 149 is a barrel cam 160 having an endless cam groove 161 therein. The follower for cam 160 comprises a roller 162 that is affixed to a bracket 163 having a vertical slot 164 in it. (See FIGURE 26.) Slot 164 has a roller 165 in it that is attached to the lower end of a pivoted drive arm 166 for the feed finger carriage shown generally at 167. The roller 162 is constrained to move back and forth in a plane passing horizontally through the axis of shaft 149 upon which the barrel cam 160 is mounted. Due to the swinging motion of the pivoted drive arm 166, the other roller 165 moves up and down within vertical slot 164. The bracket 163 is mounted upon a base 168 that is slidable on balls (not shown) rollable in V-ways. Following conventional practices, the balls are centered within gears that cooperate with toothed racks to retain the balls in place within the ways. The same type of mount is utilized for the carriage 167 for the feed fingers. In this instance, the ways are on the right side of the hopper-plate assembly, their location being shown by the dot dash lines 169 in FIGURE 9. The upper end of drive arm 166 carries a roller 170 rideable in a vertical groove defined by two plates 171—171 fastened to carriage 167 by means of bolts as shown. Arm 166 has several adjustments in it for increasing or decreasing the throw of the feed finger carriage. One of these adjustments is a major one, normally made at the time the machine is built. The cast frame member 24a has a bracket 172 affixed to it by bolts 173. (See FIGURE 4.) The bracket is in spaced parallelism to the frame member 24a and the arm 166 extends upwardly between the bracket and an embossed area 174 of the frame member 24a. Three bores, 175, 176 and 177, extend through the bracket 172 and the frame member 24a. Arm 166 has three holes in it corresponding to bores 175, 176 and 177 and it is also embossed as shown at 178 in the area of these holes. Generally speaking, by mounting a pivot element 179 in the bottom holes, the longest feed throw is obtained, the shortest feed throw is through use of the upper holes, and an intermediate throw results from pivoting the arm 166 at the middle holes as shown. Arm 166 is made in two parts. One constitutes a bellcrank 180 that is pivotally mounted as at 181 on the other part of the arm, with an eccentric adjustment being provided at 182 so that the bellcrank can be adjusted within limits around the pivot 181, this providing a fine adjustment for the throw of the feed fingers.

The feed finger carriage 167 projects above its ways and above the table 25 of the hopper-platen assembly at the right side of the machine. (See FIGURE 9.) Two assemblies are rigidly secured to the feed finger carriage to overhang a table in cantilever fashion. One assembly include the feed fingers themselves. Two fingers are employed and they are designated 183 at the left and 184 at the right. The other assembly provides a mount for an ink transfer arm designated generally by the numeral 185. The method of inking the type in the printing head is similar to that disclosed and claimed in United States Patent No. 2,756,674 which issued July 31, 1956 to Frederic L. Rieger. However, the mechanism to practice the method is unique as will be seen. In general, the reciprocating motion imparted to the feed finger carriage 167 by drive arm 166 operates the feed fingers and the elements of the inking system. Otherwise expressed, the elements of the inking system do not require an independent linkage to the drive shaft 149, this resulting in a substantial savings in the cost of the manufacture of the machine.

Feed fingers 183 and 184 are carried by a cast mount bracket 186 that is secured by means such as bolts 187—187 to the side of the feed finger carriage at the forward end thereof. Mount bracket 186 is spaced above the table 25 in order to clear labels and tags in strip form moving lengthwise of the table from the back to the front of the machine. Mount bracket 186 includes a journal 188 at the right and a journal 189 at the left for the opposite ends of a pivot shaft 190. This shaft is locked in the journal at the right by means of a set screw 191. A hub is provided for each feed finger through which shaft 190 projects. The hub to the outside of each feed finger is short as shown at 192—192. However, at the inside, hubs 193—193 are substantially long and they are separated by a washer 194 so that the two fingers are not physically interconnected. Referring to the diagrammatic drawings of FIGURES 21 and 22, it will be seen that each feed fingers has a projection 195 at the rear providing an abutment against which a coil spring 196 seats, the coil spring residing within a bore 197 in a boss 198 which, in each instance, is cast as an integral part of mount bracket 186. The coil springs 196—196 thus tend to depress the forward ends of the feed fingers down onto a supporting surface. The forward end of each feed finger slants upwardly and forwardly as shown at 199 so as to present a wedge-like face to tickets and to insure positive engagement of a lug 200, which is at the rear of the wedge-shaped surface 199, with the feed finger notches in the tickets to be fed, two such notches 201—201 being shown in FIGURE 21. To provide a clean, sharp break between lug 200 and the wedge-shaped surface 199, a square groove 202 is cut across the underside of the forward end of the feed finger just ahead of lug 200.

Figure 20:
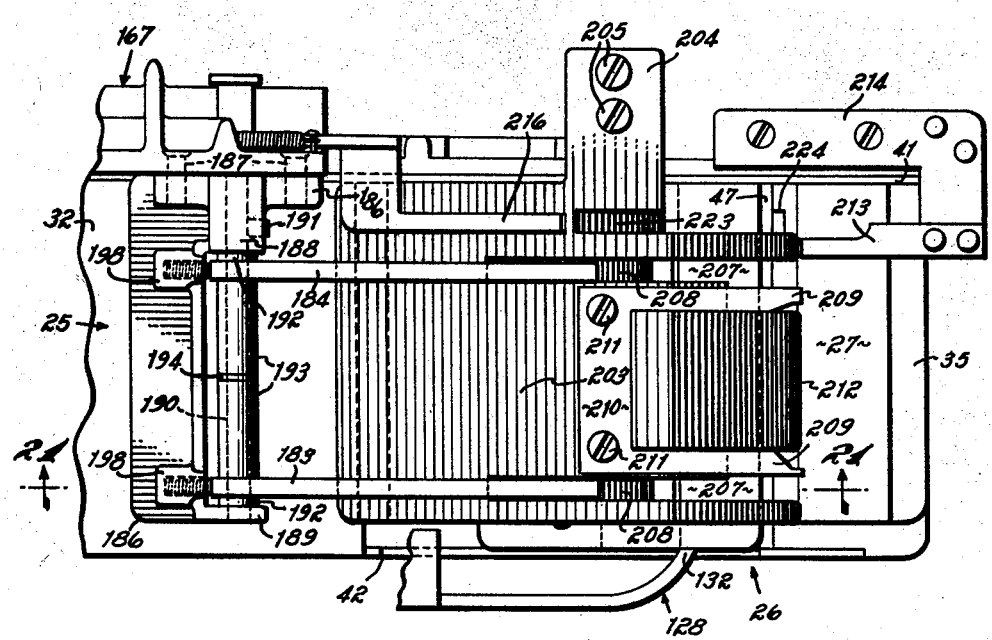
FIGURE 20 is a fragmentary elevational view illustrating the platen in the machine upon which the tags are printed.

A feed finger ramp plate designated generally 203 is provided which covers the hopper 26. This plate has an extension 204 at its right edge by means of which it is fastened by means of bolts 205 to a projection 206 on the extension 33 of the cast body 28 of the hopper-platen assembly. Two slots 207—207 are cut into the forward edge of the feed finger ramp plate adjacent to the two sides of plate 203, these slots being in alignment with the feed fingers as best shown in FIGURE 20. The rear ends of these slots terminate at the forward ends of ramps 208—208 upon which the forward ends of the feed fingers ride. The forward ends of the slanting ramps 208 terminate such that they are spaced rearwardly of the front part of a multi-part ticket so that the feed finger notches in the ticket are exposed for engagement by the lugs 200—200 of the feed fingers when they move forwardly off the ramps. The slots 207—207 are wider in the forward areas thereof to accommodate the ends 209—209 of a U-shaped ticket hold-down device 210 that is made of spring steel. This hold-down device is fastened by machine screws 211—211 to the top of the feed finger ramp plate 203 in between ramps 208—208. The forward ends 209—209 of the hold-down device span the space between the forward edge of the uppermost ticket in the hopper and the rear edge of platen 27. The same is true of the forward edge 212 of plate 203 in the area thereof between slots 207—207 and in the side areas thereof to the sides of these slots. The forward areas of plate 203 slant downwardly to provide clearance for the transfer arm 185 as will be seen. There is also a ticket hold-down device including a leaf spring 213 and a mount bracket 214 for the spring to hold tickets onto the platen during printing. The mount bracket 214 is secured to bosses provided in the forward part of the extension 33 at the right end of the box-like casting 35 on which the platen 27 is secured. Clearance is provided underneath the mount bracket 214 so that tickets can pass under it as they move from the machine. The central area of the platen as shown in FIGURE 18 presents a sharp shoulder 215 to tickets within the hopper. The sides of the platen toward oncoming tickets is relieved at the sides of this sharp shoulder 215 for clearance purposes. Shoulder 215 and the underside of the forward edge 212 of plate 203 define a "gate" to insure that only one ticket at a time can move from the hopper onto the platen.

There is a third finger, constituting a stop finger 216 that rides with the feed fingers 183–184. This finger 216 is pivotally mounted as at 217 on the upper end of a lever 218 which is, in turn, pivotally mounted as at 219 on the side of the carriage 167. A coil spring 220 having one end fastened to carriage 167 by means of a pin 221 and having the other end thereof fastened to an ear 222 at the rear of stop finger 216 serves to depress the forward end of stop finger 216. A ramp 223 is provided in plate 203 for finger 216 so that it comes down onto the upper surface of the uppermost ticket in the hopper. There is a square notch 224 in the rear edge of platen 27 in alignment with ramp 223 and the stop finger 216. Under normal operation, when there is a ticket within the hopper the forward edge of stop finger 216 rides on top of the uppermost ticket as the uppermost ticket is moved onto the platen by the feed fingers. However, should there be no ticket to be moved by the feed fingers, the forward end of the stop finger 216 drops down into notch 224 and it stops. However, there is a continued over-travel of the carriage 167 beyond this stopping point, and as may be seen in FIGURE 9, such over-travel causes a relative shifting movement of finger 216 toward the rear causing the lever 218 to pivot so as to swing its lower end relatively forward. When this happens, the forward end of a bolt 225, which threads through a right angular flange 226 on the lower end of lever 218, being locked therein by a lock nut, comes into contact with a micro-switch (not shown) that completes a circuit to solenoid operated means for tripping the clutch 153. The details of the circuitry are disclosed in copending patent application, Serial No. 346,240, filed February 20, 1964. The automatic stop afforded by stop finger 216 is used in situations wherein a specified number of tickets constituting a complete run are inserted as a group into the empty hopper.

Figure 19:
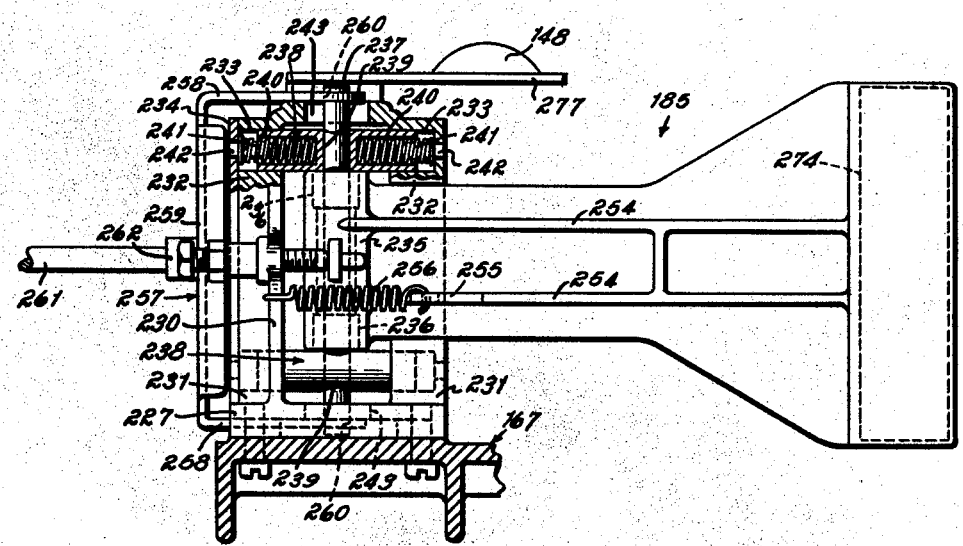
FIGURE 19 is a fragmentary cross-sectional view looking at the underside of the ink pad carrier and its associated mechanism.

Ink transfer arm 185 is mounted in a cast frame 227 which is box-like in construction. Bolts 228—228 thread through the wall of the carriage 167 and into the frame. This is best seen in FIGURE 19 which is a bottom plan view. As may be seen in FIGURE 3 the top 229 of the frame is essentially closed, whereas the bottom and front are essentially opened. (See FIGURES 23–24). A wall 230 extends across the back of the frame. There are two pairs of bosses within the box-like frame at the sides thereof. The bosses at the right side being identified 231—231 and at the left side by 232—232 (these numerals appear to be reversed in FIGURE 19 since this is a bottom view). The bosses of each pair have bores 233—233 that are in alignment with one another as shown in FIGURE 19. For fabrication purposes, a cover plate 234 is provided at the back of the frame. The ink transfer arm 185 includes a journal sleeve 235 at the rear end thereof cast as an integral part of the arm. This sleeve is bored and then counterbored to seat bushings 236—236 in its ends. A shaft 237 extends through bushings 236—236 to pivotally mount the arm 185. Just beyond the ends of the journal sleeve 235, the shaft 237 passes through spring loaded bearings designated generally 238—238. These bearings are in the form of pins, each one of which has a bore 239 passing transversely through its center to receive shaft 237. Each pin 238 also has bores 240—240 extending longitudinally inwardly from its opposite ends, these bores stopping short of the central area of pin 238 through which shaft 237 projects. Referring now to the bearing at the top of FIGURE 19, the opposite ends of each pin 238 are received in the aligned bores 233—233 in a pair of bosses 232—232. However, pin 238 is substantially shorter in overall length than the distance between the plate 234 that covers the back of the bore 233 at the rear and the inner end of the forward bore 233. A coil spring 241 is seated within each of the bores 240 at the respective ends of pin 238. In each instance, the pin is centered on a stud 242 secured to the frame at the forward end and secured to the cover plate at the rear end. The opposite ends of the shaft 237 project through slots 243—243 in the end walls of frame 227. It may be seen, therefore, that shaft 237 is shiftable back and forth within the frame and normally is held in a centered position by the opposing forces of the coil springs 241—241.

Reference is now made to FIGURES 23–25. Referring first to FIGURE 23 which shows a neutral position for the ink transfer arm 185, it will be noted that the journal sleeve 235 has an ear 244 projecting upwardly from it at the center and that this ear passes through an opening 245 in the top wall 229 of the cast frame 227. A rib 246 is provided at the back of ear 244 to strengthen it, however, the forward face of the ear is planar to provide an abutment surface that faces toward the front of the machine. Another ear 247, similar to ear 244, is provided at the center of journal sleeve 235 at the underside thereof. In this instance, a rib 248 is provided at the front of the ear with the rearwardly facing surface of the ear being planar to provide an abutment surface. The two abutment surfaces of the ears 244 and 247 cooperate respectively with an adjustable abutment screw 249 at the top and an adjustable abutment screw 250 at the bottom. Upper abutment screw 249 is threadedly engaged through a boss 251 cast as an integral part of the frame member 227. The lower abutment screw 250 is threadedly engaged through an embossed part 252 of the wall 230 that extends across the back of the box-life frame member. In each instance, a lock nut 253 is provided for locking the screw in a position of adjustment. The underside of the ink transfer arm 185 is ribbed as shown at 254—254 and the rib at the right has an extension 255 depending from it to provide an attachment for the forward end of a coil spring 256. The rear end of this coil spring is attached to wall 230 so that the force of this spring tends to swing the forward end of the ink transfer pad downwardly. In the neutral position shown in FIGURE 23, this downward movement is resisted and stopped by the forward end of adjustable abutment screw 250 making contact with the rear face of the lower ear 247. In this position, there is a space between the forward face of the upper ear 244 and the adjustable abutment screw 249 associated therewith.

Referring to FIGURE 24, it will be seen that when the shaft 237 is slid relatively forwardly within the slots 243—243 in cast frame 227, contact is made between upper ear 244 and its associated adjustable abutment screw 249 which has the net effect of swinging the forward end of the ink transfer arm 185 upwardly. This is an ink pick-up position which will be explained later. On the other hand, if the shaft 237 is slid relatively toward the rear in the slots 243—243 of cast frame 227, the contact between the lower adjustable abutment screw 250 and the lower ear 247, with which it is associated, also causes the front end of the ink transfer arm 185 to swing upwardly. Therefore, whether it be relative forward movement of the shaft 237 or relatively rearward movement of shaft 237 within the slots 243—243 an upward movement of the transfer arm 185 results. One of these upward movements, an ink pick-up movement, occurs adjacent to the end of the rearward travel of the feed finger carriage 167 and the other, an ink depositing movement, occurs adjacent to the end of the forward travel of the feed finger carriage.

Again referring to FIGURE 19, a yoke is designated generally by 257. This yoke includes two side arms 258—258 that extend forwardly along the two sides of the cast frame 227. These arms are connected at the rear of the cast frame 227 by a cross bar 259. As shown, the cross bar is channeled-shaped in cross section for rigidity. The outer ends of arms 258—258 of the yoke 257 have holes in them to receive the ends of the shaft 237 as shown at 260—260 in FIGURE 19. A reach rod 261 is rigidly secured to the rear of the cross bar 259 at its center by means of a collar 262 welded or otherwise affixed to the cross bar.

Reach rod 261 projects to the rear from cross bar 259 and passes through a ball socket bearing 263 in which it is slidably journalled. This bearing is held in place by a retainer plate 265 within a counterbore through a wall 266 that is part of a mount bracket 267. The mount bracket is fastened to a plate 268 that is affixed to and projects above the right side of the cast frame member 16. Between the collar 262 and the bearing 263, the reach rod has an abutment sleeve 269 mounted on it. It is preferred that means such as O-rings or rings of nylon of the type shown at 270 encircle the reach rod between the abutment sleeve 269 and the collar 262. The rear end of the reach rod has a collar 271 pinned to it. Another abutment sleeve 272, substantially shorter in length than abutment sleeve 269, is mounted on the reach rod between the collar 271 and the bearing 263. O-rings or nylon rings encircle the reach rod, as shown at 273 between collar 271 and retainer sleeve 272. The rings 270 and 273 serve as cushions as will be seen.

The function of reach rod 261 also will be explained under the subheading "Operation." Generally however, the feed finger carriage 167 has a forward and backward stroke that is slightly longer than that part of the reach rod that is shown between the abutment sleeve 272 and the rear face of bearing 263. Thus, as may be seen from a comparison of FIGURES 23 and 24, when the feed finger carriage retracts to a point to bring the rear end of abutment sleeve 269 into contact with the bearing 263, any relative over-travel of the feed finger carriage, as it moves toward the rear, will result in a relative forward motion of the shaft 237 within slots 243, and as has been explained this relative movement lifts the forward end of the ink transfer arm 185. This relation is shown in FIGURE 24. At the forward end of its stroke, as the feed finger carriage 167 approaches its fully forward position, the forward end of the abutment sleeve 272 makes contact with the rear of bearing 263 and the continued, relative over-travel of the feed finger carriage results in a movement of shaft 237 that is relatively rearwardly within slots 243 which, as has been explained, again results in an upward movement of the ink transfer arm 185. Thus, the ink transfer arm swings up at both ends of the forward and backward traveling movement of the feed finger carriage. This alternately brings an ink transfer pad 274 into contact with the underside of an ink reservoir 275 and the undersurfaces of the printing characters on the type carrying bands 3.

Reference is made to United States Patent No. 2,756,674 for the details of the inking method utilized. For the purposes of this disclosure it is believed sufficient to state that means shown generally at 276 are provided for adjustably fastening ink reservoir 275 to the underside of the mount bracket for the printing head 2. The adjustment provided is such that the underface of the ink reservoir makes flat facially contact with the upper surfaces of ink transfer pad 274 at the back of the feed finger carriage stroke. The contact is a light one so as to not squeeze ink from the reservoir, but rather merely lift a film of ink from the underside of the reservoir. The amount of pressure during contact can be varied by adjusting upper abutment screw 249 which changes the throw of the arm 185 upon which the ink transfer pad 274 is carried. At the forward end of the stroke the amount of pressure exerted by the ink transfer pad 274 against the type characters can be adjusted by means of the lower abutment screw 250. Here again, the pressure is a light one and it is exerted only momentarily so that the film of ink deposited by the reservoir is lifted from the ink transfer pad during contact with the type. The pressure of the printing head against tags, tickets, or labels during a printing operation can be varied by adjusting the overall length of the adjustable link 159 provided in crank arm 155.

Operation

There are two ways to operate the machine so that it stops automatically after a preselected number of tags have been printed. In one, the counter 11 is relied upon. In the other, the stop finger 216 is relied upon. In the first type of operation, more tags than are required for a particular run may be in place in the hopper. In the other, useful in short runs and in instances when tags are color coded, the tags may be precounted and only those desired for a particular run placed in the hopper. Under these conditions, as the last tag is fed from the machine, the stop finger 216 drops into the square notch 224 and the lever 218 is moved to deactivate the machine.

The machine is initially set to accommodate the type of ticket to be printed depending upon the number of parts in the multi-part ticket. This is done by setting the knob 68 that is at the left side of the machine, this knob determining the position of the pusher plate 52 within the hopper 26. The hopper loading lever 110 at the front of the machine may then be depressed to lower the hopper table, the hopper gate 128 swung open, the tickets placed in the hopper and the hopper gate closed. The release of the hopper loading lever permits the "Negator" springs 90—90 to lift the table and to bring the uppermost ticket up into a position beneath the ramp plate 203. If the tickets being run have more or less parts than those previously run, the ticket set knob 12 is changed such that the arrow shown thereon points to the number corresponding to the number of parts of the tickets. The reset knob 13 is then given a full turn counterclockwise and as explained in copending application Serial No. 346,240, this conditions the counter so that it tallies one full count at the end of that number of cycles of the machine corresponding to the number of parts in the tickets being run. The counter is set at the desired number, and the data to be imprinted on the tickets is set in the printing head. The start button 9 may then be depressed to trip clutch 153 and the first cycle begins.

The starting or "home" position of the machine is shown in FIGURE 4. At the start of the cycle, the ink transfer pad 274 is down and away from the ink reservoir 275 and it carries a freshly deposited film of ink. The hopper platen assembly, in the last cycle of the previous run passed the position in which the platen 27 is in printing contact with a ticket so that there is a space between the platen and the type carried by the printing head. At this time, the tamper 132 is in contact with the upper ones of the tickets within the hopper and the uppermost one of the tickets is positioned against guide bar 41 so that its feed finger notches are in proper alignment for engagement by the feed fingers 183–184. As the cycle begins, the feed finger carriage 167 moves forwardly to bring the feed fingers into contact with the feed finger notches in the uppermost ticket. As the front part of the uppermost ticket is fed onto the platen, the rider block 148 becomes effective. This block is affixed to a bracket 277 which is secured to the top of cast frame 227. The bracket extends down along the side of the left end of the cast frame and projects forwardly to place the rider block 148 in a position in which it comes into contact with the cam surface 147 on the hopper gate 128, to swing the tamper 132 out of contact with the tickets, after the uppermost ticket is under control of the feed fingers. This condition is shown in FIGURE 5 and at this time, the abutment sleeve 272 has just come into contact with the ball socket bearing 263. Also at this time the hopper platen assembly is approaching the lowermost point of its travel, but the forward part of the ticket has not been fed into final printing position on platen 27. As the cycle continues, with the feed finger carriage 167 continuing its forward movement, over-travel of the feed finger carriage relative to the reach rod pulls the shaft 237 relatively rearwardly in the slots 243—243 which causes the transfer arm 185 to swing upwardly. This is a result of the lower ear 247 pivoting upon the lower adjustment screw 250. As shown in FIGURE 6, the upward movement of the transfer arm 185 brings the ink transfer pad 274 thereon up into contact with the type carried in the printing head. At this time, the feed fingers are fully forward and the hopper platen assembly is at the lowest point in its cycle.

As the feed finger carriage begins to retract, the hopper platen assembly begins to rise and as the rider block 148 moves back, the hopper gate 128 is free to move in under the action of the spring 133 to bring the tamper 132 into contact with the uppermost ones of the tickets in the stack. As shown in FIGURE 7, abutment sleeve 269 comes into contact with the ball socket bearing 263 just before the feed finger carriage reaches its fully retracted position. The contact between the abutment sleeve 269 and ball socket bearing 263 results in a relative overtravel which causes the shaft 237 to move relatively forwardly within slots 243—243. This causes the upper ear 244 on transfer arm 185 to pivot about the upper abutment screw 249, bringing ink transfer pad 274 into contact with the underside of the ink reservoir 275. This is shown in FIGURE 8. At this same time, the hopper platen assembly is at the highest point and the ticket part on platen 27 is firmly pressed against the printing characters in the printing head. If the machine were stopped at this point, the carriage would move forwardly slightly from the position shown in FIGURE 8 to permit the transfer arm 185 to lower, which is the home position illustrated in FIGURE 4. However, continued cycling of the machine feeds the second and then the third part, of the three part tickets shown, into printing positions and then the next ticket part by part until the counter reaches its zero position which automatically decommissions the machine.

Having described my invention, I claim:

1. In a marking machine, the improvement comprising a printing head having printing characters exposed at the underside thereof, means mounting said printing head adjacent to the front of the machine in an elevated fixed position, a hopper-platen assembly having the rear end thereof pivoted on a horizontal axis for rocking motion in which a platen atop the forward end thereof moves up and down beneath said printing characters, a ticket hopper adapted to hold a supply of stacked tickets in said assembly immediately to the rear of said platen, means including said platen defining a gate through which one ticket at a time may be fed from said hopper onto said platen, a feed finger carriage mounted for reciprocating forward and backward movement on a side of said assembly, feed fingers mounted on said carriage and adapted to engage the uppermost ticket in the hopper and feed said ticket onto said platen during the forward motion of said feed finger carriage, a drive shaft extending from the back to the front of the machine underneath said assembly and having crank means at the forward end thereof to impart said rocking motion to said assembly, means including cam means associated with said drive shaft for imparting said reciprocating movement to said feed finger carriage, and said crank means and said cam means being interrelated such that said forward movement of the feed finger carriage occurs only during downward movement of said platen and said rearward movement of said feed finger carriage occurs only during upward movement of said platen.

2. In a marking machine, the improvement as set forth in claim 1 in which an ink reservoir is provided and in which means are provided to mount said ink reservoir to the rear of said printing head and in which means are provided to transfer ink from said reservoir to said printing characters, the last named means being attached to said feed finger carriage and movable therewith.

3. In a marking machine, the improvement as set forth in claim 1 in which an ink reservoir is provided and in which means are provided to mount said reservoir to the rear of said printing head and in which means are provided to transfer ink from said reservoir to said printing characters, the last named means comprising frame means attached to said feed finger carriage and movable therewith, an ink transfer arm having an ink transfer pad at the forward end thereof, means pivotally mounting the rear end of said ink transfer arm in said frame means and being arranged to permit relative forward and backward shifting motion of said ink transfer arm relative to said frame means, a reach arm, means attaching said reach arm to said means pivotally mounting the rear end of said ink transfer arm, abutment means on said reach arm effective only in the last part of the forward movement and in the last part of the backward movement of said feed finger carriage to shift said ink transfer arm relatively toward the rear and relatively toward the front of said frame means, and pivot means associated with said frame means for translating such shifting movement to an upwardly swinging movement for the forward end of said ink transfer arm to bring said ink transfer pad thereon into contact with said reservoir in the end of the backward movement of said feed finger carriage and to bring the ink transfer pad into contact with said printing characters at the end of the forward movement of said feed finger carriage.

4. In a marking machine, the improvement as set forth in claim 1, in which said ticket hopper is open to a side of said assembly, a hopper gate, means mounting said hopper gate for swinging motion toward and away from the open side of said hopper, spring means normally urging said hopper gate toward said open side, a tamper on said hopper gate engageable with the upper ones of tickets within said hopper, means movable with said feed finger carriage adapted to contact said hopper gate and move said tamper out of engagement with said tickets as said feed finger moves toward said platen, and the last named means adapted to move out of contact with said hopper gate as said feed finger carriage moves away from said platen to permit said tamper to strike said tickets under the action of said spring means.

5. In a marking machine, the improvement as set forth in claim 3 in which spring means are provided to urge said means pivotally mounting the rear end of said ink transfer arm into a relatively centered position between the limits of said forward and backward shifting motion.

6. In a marking machine, the improvement as set forth in claim 3 in which spring means are provided to urge said ink transfer arm toward a position in which the ink transfer pad at the forward end thereof is normally below the level of the ink reservoir and the printing characters in said printing head.

7. In a marking machine, the improvement as set forth in claim 3 in which said pivot means associated with said frame means comprises an adjustable abutment screw disposed above said ink transfer arm cooperable with an ear projecting upwardly from the rear end of said ink transfer arm and an adjustable abutment screw disposed below said ink transfer arm and cooperable with an ear depending from the rear end of said ink transfer arm, the first mentioned abutment screw becoming effective as pivot means in the last part of the backward movement of the feed finger carriage and the second mentioned abutment screw becoming effective as pivot means during the last part of the forward movement of said feed finger carriage.

8. In a marking machine, the improvement comprising, a hopper-platen assembly having a printing platen atop one end thereof, means pivotally journalling the opposite end of said assembly for rocking motion in which said platen moves up and down, a ticket hopper in said assembly adjacent said platen, a feed finger carriage mounted on said assembly for reciprocating movement toward and away from said platen, said ticket hopper being opened to a side of said assembly, a hopper gate, means mounting said hopper gate for swinging motion toward and away from the open side of said hopper, spring means normally urging said hopper gate toward said open side, a tamper on said hopper gate engageable with the upper ones of tickets within said hopper, means movable with said feed finger carriage adapted to contact said hopper gate and move said tamper out of engagement with said tickets as said feed finger carriage moves toward said platen, and the last named means adapted to move out of contact with said hopper gate as said feed finger carriage moves away from said platen to permit said tamper to strike said tickets under the action of said spring means.

References Cited by the Examiner

UNITED STATES PATENTS

| | | | |
|---|---|---|---|
| 214,797 | 4/79 | Weir | 271—43 |
| 417,994 | 12/89 | Dunn et al. | 101—69 |
| 1,291,074 | 1/19 | Milmoe et al. | 271—41 |
| 1,987,395 | 1/35 | English | 271—43 |
| 2,333,490 | 11/43 | Phillippi | 271—43 |
| 2,627,804 | 2/53 | Bone | 101—69 |
| 2,756,674 | 7/56 | Rieger et al. | 101—301 |
| 3,089,697 | 5/63 | Brozo | 271—89 X |

WILLIAM B. PENN, *Primary Examiner.*